United States Patent
Travis

(10) Patent No.: US 9,541,235 B2
(45) Date of Patent: Jan. 10, 2017

(54) BELTED TOROID PRESSURE VESSEL AND METHOD FOR MAKING THE SAME

(75) Inventor: Robert D. Travis, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 1429 days.

(21) Appl. No.: 13/029,769

(22) Filed: Feb. 17, 2011

(65) Prior Publication Data

US 2012/0210695 A1 Aug. 23, 2012

(51) Int. Cl.
*B65D 88/04* (2006.01)
*F17C 1/00* (2006.01)

(52) U.S. Cl.
CPC .............. *F17C 1/00* (2013.01); *B65D 88/04* (2013.01); *F17C 2201/0133* (2013.01); *F17C 2203/067* (2013.01); *F17C 2203/0619* (2013.01); *F17C 2203/0639* (2013.01); *F17C 2203/0643* (2013.01); *F17C 2203/0648* (2013.01); *F17C 2209/21* (2013.01); *F17C 2209/2109* (2013.01); *F17C 2221/014* (2013.01); *F17C 2223/0123* (2013.01); *F17C 2223/036* (2013.01); *F17C 2270/0197* (2013.01); *Y10T 29/49346* (2015.01)

(58) Field of Classification Search
CPC .............. F17C 1/02; F17C 1/00; F17C 3/00; F17C 2201/0133; F17C 2201/01; F17C 2203/012; F17C 2203/011; F17C 2203/01; F23R 3/52; B65D 88/04; B65D 88/02; B65D 25/24; B65D 25/22
USPC ......... 60/752, 753, 754, 755, 756, 757, 758, 60/759, 760; 220/566, 565, 592, 581, 675, 220/669, 634, 628
See application file for complete search history.

(56) References Cited

U.S. PATENT DOCUMENTS

| | | | | | |
|---|---|---|---|---|---|
| 1,622,787 | A | * | 3/1927 | Horton | 220/565 |
| 2,848,133 | A | * | 8/1958 | Ramberg | 220/590 |
| 3,106,940 | A | * | 10/1963 | Young | 138/125 |
| 3,266,660 | A | * | 8/1966 | Ragettli | 206/521 |

(Continued)

FOREIGN PATENT DOCUMENTS

| | | |
|---|---|---|
| JP | 10113777 A | 5/1998 |
| JP | 2008249021 A | 10/2008 |

(Continued)

OTHER PUBLICATIONS

"International Application Serial No. PCT/US2011/064929, International Search Report mailed Jun. 15, 2012", 5 pgs.

(Continued)

*Primary Examiner* — William H Rodriguez
(74) *Attorney, Agent, or Firm* — Schwegman Lundberg & Woessner, P.A.

(57) ABSTRACT

A toroid pressure vessel includes a toroid body having an inner shell and an outer shell. The toroid body includes a toroid outer perimeter. The outer shell extends along the toroid outer perimeter. A planar exterior face extends along at least a portion of the outer shell and the toroid outer perimeter. A support belt circumscribes the toroid outer perimeter and is coupled along the planar exterior face. The support belt braces and supports the pressure vessel along the toroid outer perimeter against bulging force (and hoop stress) generated by pressurized fluids within the vessel. The support belt facilitates the use of thinner pressure vessel shells and thereby decreases the weight of the pressure vessel while providing a support to the outer shell that substantially prevents deformation of the planar exterior face.

27 Claims, 10 Drawing Sheets

(56) References Cited

U.S. PATENT DOCUMENTS

| | | | | |
|---|---|---|---|---|
| 3,293,860 | A | * | 12/1966 | Stedfeld .......................... 60/263 |
| 3,394,738 | A | * | 7/1968 | Baron et al. .................. 138/177 |
| 3,550,253 | A | * | 12/1970 | Frey .............................. 228/170 |
| 3,579,806 | A | * | 5/1971 | Huberdeau ..................... 29/463 |
| 3,772,750 | A | * | 11/1973 | Hauser ........................ 29/899.1 |
| 3,847,716 | A | * | 11/1974 | Dorsch ........................... 428/37 |
| 3,979,005 | A | * | 9/1976 | Robinson et al. ....... 220/560.07 |
| 4,180,972 | A | * | 1/1980 | Herman et al. ................. 60/800 |
| 4,191,011 | A | * | 3/1980 | Sweeney et al. ............... 60/796 |
| 4,195,475 | A | * | 4/1980 | Verdouw ........................ 60/754 |
| 4,195,476 | A | * | 4/1980 | Wood ............................. 60/737 |
| 4,232,527 | A | * | 11/1980 | Reider ............................ 60/754 |
| 4,299,289 | A | * | 11/1981 | Kato ............................... 169/57 |
| 4,369,894 | A | * | 1/1983 | Grover et al. ................. 220/590 |
| 4,475,662 | A | * | 10/1984 | Mandel ......................... 220/589 |
| 4,561,476 | A | * | 12/1985 | Bunkoczy ................. 141/311 R |
| 4,582,211 | A | * | 4/1986 | Mandel ......................... 220/589 |
| 4,614,279 | A | * | 9/1986 | Toth et al. .................... 220/590 |
| 4,790,472 | A | * | 12/1988 | Bunkoczy ..................... 228/171 |
| 4,817,855 | A | * | 4/1989 | Bunkoczy ..................... 228/171 |
| 5,150,812 | A | * | 9/1992 | Adams .......................... 220/589 |
| 5,452,867 | A | * | 9/1995 | Grunwald et al. ......... 244/117 R |
| 5,488,970 | A | * | 2/1996 | Cippitani ......... B60K 15/03006 |
| | | | | 137/351 |
| 5,851,027 | A | * | 12/1998 | DiGiacomo et al. ......... 280/736 |
| 6,357,439 | B1 | * | 3/2002 | Cook et al. ............. 128/205.22 |
| 6,547,189 | B1 | * | 4/2003 | Raboin et al. .............. 244/158.3 |
| 6,719,165 | B2 | * | 4/2004 | Wright et al. ................. 220/586 |
| 8,122,646 | B1 | * | 2/2012 | Johnson ......................... 52/2.22 |
| 8,186,535 | B2 | * | 5/2012 | Shearn .......................... 220/564 |
| 8,991,641 | B2 | * | 3/2015 | Ozawa .................. B29C 53/588 |
| | | | | 220/566 |
| 2005/0132745 | A1 | * | 6/2005 | Haberbusch et al. .......... 62/600 |
| 2006/0096980 | A1 | | 5/2006 | Jaslow |
| 2008/0093367 | A1 | | 4/2008 | Gilbertson et al. |
| 2012/0043320 | A1 | * | 2/2012 | Beem ....................... F17C 1/16 |
| | | | | 220/4.14 |
| 2013/0098919 | A1 | * | 4/2013 | Jarzynski ......... B60K 15/03006 |
| | | | | 220/566 |

FOREIGN PATENT DOCUMENTS

| | | |
|---|---|---|
| JP | 2010525242 A | 7/2010 |
| JP | 4611526 B2 | 1/2011 |
| WO | WO-2012/112208 A1 | 8/2012 |

OTHER PUBLICATIONS

"International Application Serial No. PCT/US2011/064929, Invitation to Pay Additional Fees mailed Apr. 9, 2012", 2 pgs.

"International Application Serial No. PCT/US2011/064929, Written Opinon mailed Jun. 15, 2012", 6 pgs.

"European Application Serial No. 11858531.4, Office Action mailed Oct. 4, 2013", 2 pgs.

"European Application Serial No. 11858531.4, Response filed Feb. 27, 2014 to Office Action mailed Oct. 4, 2013", 4 pgs.

"Israeli Application Serial No. 227743, Amendment filed Dec. 23, 2013", 9 pgs.

"Japanese Application Serial No. 2013-554440, Office Action mailed Mar. 24, 2015", 5 pgs.

"Japanese Application Serial No. 2013-554440, Response filed May 25, 2016 to Office Action mailed Jan. 19, 2016", (English Translation of Claims), 15 pgs.

"Japanese Application Serial No. 2013-554440, Office Action mailed Jan. 19, 2016", w/English Translation, 12 pgs.

* cited by examiner

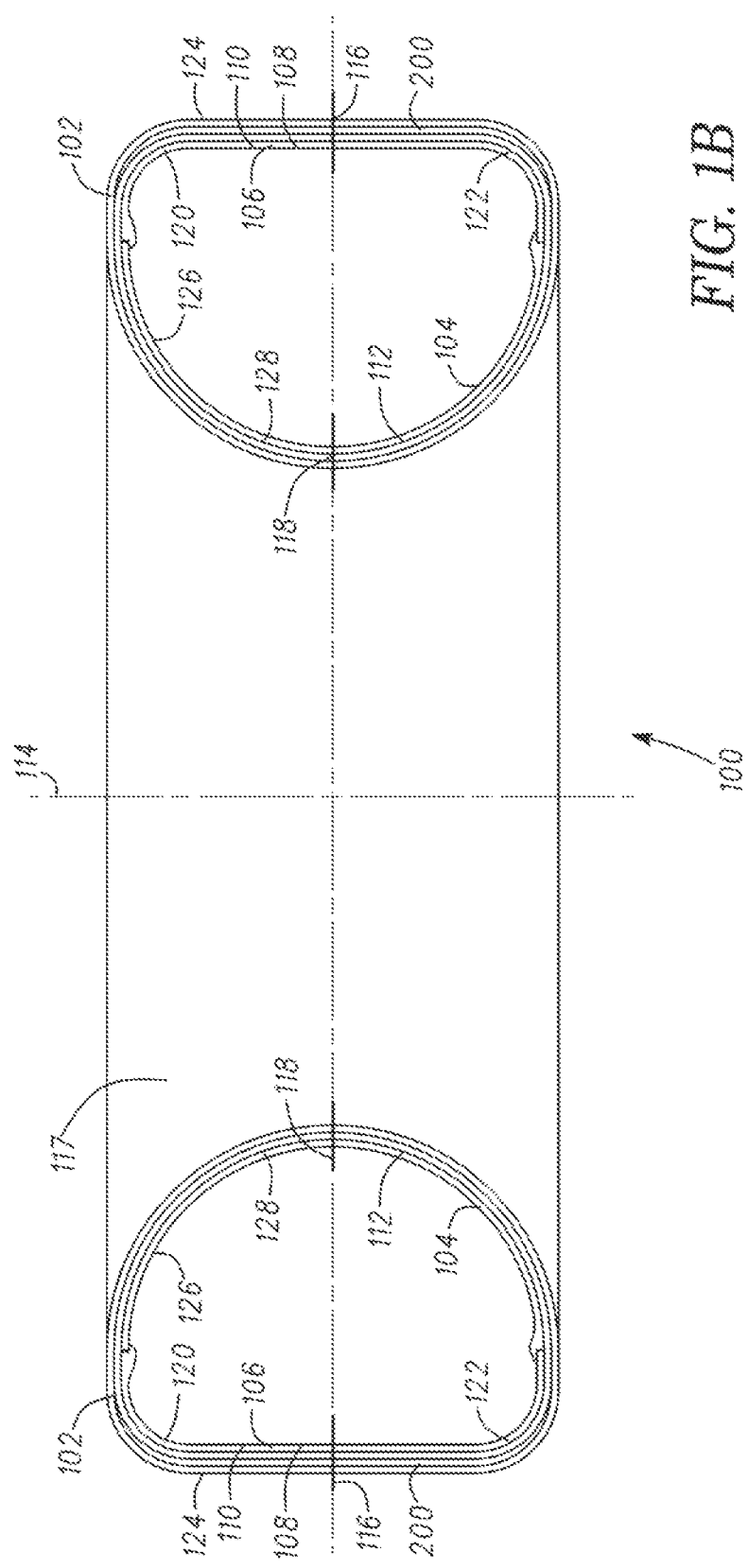

BELTED TOROID PRESSURE VESSEL AND METHOD FOR MAKING THE SAME

GOVERNMENT SUPPORT CLAUSE

This invention was made with government support under Contract Number HQ0276-08-C-0001 awarded by the Missile Defense Agency. The government has certain rights in the invention.

TECHNICAL FIELD

Pressure Vessels. Some embodiments pertain to pressure vessels for use in rocket motors.

BACKGROUND

Pressure vessels are used within rockets, missiles and other aerospace vehicles for containment and storage of pressurized fluids. One such use of pressure vessels within rocket motor sections is to provide a source of pressurized gas (such as nitrogen) for use in attitude control systems (ACS) to steer and stabilize rockets in flight. Pressure vessels hold gas therein at extremely high pressures (e.g., 5000 to 8000 psi) and correspondingly require robust structure for safe storage. Pressure vessels are constructed with durable materials including steel, titanium and the like. The thickness of these materials is increased at known stress concentrations to ensure the pressure vessel does not fail before or during flight. Further, the materials of the pressure vessel are thickened to ensure the pressure vessel maintains its shape and does not unpredictably deform. A bulging pressure vessel may impinge against other components in the rocket motor section including the aerodynamic shroud covering the motor. Increasing the thickness of the vessel materials correspondingly increases the pressure vessel weight and the overall weight of the rocket motor section, and also reduces pressure vessel fluid volume. The increased weight diminishes motor section performance (range, responsiveness to course corrections and the like).

Additionally, pressure vessel shapes are fit within the rocket motor section and the space needed for a pressure vessel competes with space needed for other components. The pressure vessel shape is also chosen to provide strength and minimize stress concentrations within the vessel. In one example, a toroid with a circular cross section is used because of the known strength of a circle. A pressure vessel using a circular toroid occupies significant space within a rocket motor section and does not readily fit adjacent to components having shapes that do not correspond to a circle or toroid. Additional space is thereby provided between the other components and the pressure vessel to fit the pressure vessel within the motor section. The added space to house the pressure vessel increases the motor section size and weight and further degrades the motor section performance.

SUMMARY

In accordance with some embodiments, toroid pressure vessels having a D-shaped cross section and a method for making the same are discussed that provide a pressure vessel with enhanced toroid hoop strength and a shape that closely matches a composite shape formed by components within a rocket motor section. The D-shaped cross section provides a planar exterior face mated to a tapering (e.g., semicircular) inner profile. The planar exterior face is configured for positioning adjacent to a cylindrical shroud of a rocket motor section. The tapering inner profile is configured for positioning adjacent to a motor section tapered end and the tapering frustum of a rocket nozzle. The D-shaped toroid pressure vessel thereby fills the space between these components of the rocket motor section and correspondingly maximizes the volume of gas storage allowed relative to previous designs including for instance toroid vessels with circular cross sections. Conversely, the planar exterior face of the pressure vessel maximizes the storage capacity of the vessel and facilitates the use of a smaller pressure vessel (relative to a circular section toroid) within the rocket motor section. The rocket motor section volume, weight and the like may thereby be minimized while still allowing for equivalent gas storage relative to previous designs.

The planar exterior face of the D-shaped toroid pressure vessel extends around at least a portion of the toroid outer perimeter and provides a planar surface to receive and retain a support belt extending around the toroid outer perimeter. In effect, the planar exterior face provides a stabilizing shelf that positions the support belt along the toroid outer perimeter and maintains the support belt along the perimeter. The planar exterior face thereby substantially prevents slipping of the support belt from around the toroid outer perimeter after the support belt is adhered to the vessel and the vessel is pressurized. The support belt extending around the toroid outer perimeter enhances the strength of the outer shell and enhances the strength of the pressure vessel against hoop stresses (e.g., bulging forces along the toroid perimeter as compared to bursting forces incident on the perimeter of the toroid section). The support belt further assists in maintaining the shape of the toroid pressure vessel and substantially prevents the tendency of a toroid body to straighten under pressure into a cylindrical configuration (e.g., the tendency of a toroid to fracture along a section and assume a more cylindrical shape).

In one example, the support belt is used in combination with helically wound courses of wrapping (e.g., carbon fiber tape, dipped carbon fiber tow and the like). The helically wound courses of wrapping enhance the strength of the D-shaped pressure vessel against bursting forces incident on the perimeter of a toroid section (e.g., inner and outer shells) while the support belt protects against bulging forces incident on the toroid outer perimeter (e.g., the outermost portion of the toroid corresponding to the outer shell). Additionally, the helically wound courses of wrapping engage with the support belt and further stabilize the support belt at the position along the toroid outer perimeter.

Other features and advantages will become apparent from the following description of the embodiments, which description should be taken in conjunction with the accompanying drawings.

BRIEF DESCRIPTION OF THE DRAWINGS

A more complete understanding of the present subject matter may be derived by referring to the detailed description and claims when considered in connection with the following illustrative Figures. In the following Figures, like reference numbers refer to similar elements and steps throughout the Figures.

FIG. 1B is a cross sectional view of the toroidal pressure vessel shown in FIG. 1A.

Elements and steps in the Figures are illustrated for simplicity and clarity and have not necessarily been rendered according to any particular sequence. For example, steps that may be performed concurrently or in different order are illustrated in the Figures to help to improve understanding of examples of the present subject matter.

DESCRIPTION OF THE DRAWINGS

In the following detailed description, reference is made to the accompanying drawings which form a part hereof, and in which is shown by way of illustration specific examples in which the subject matter may be practiced. These examples are described in sufficient detail to enable those skilled in the art to practice the subject matter, and it is to be understood that other examples may be utilized and that structural changes may be made without departing from the scope of the present subject matter. Therefore, the following detailed description is not to be taken in a limiting sense, and the scope of the present subject matter is defined by the appended claims and their equivalents.

The present subject matter may be described in terms of functional block components and various processing steps. Such functional blocks may be realized by any number of techniques, technologies, and methods configured to perform the specified functions and achieve the various results. For example, the present subject matter may employ various materials, actuators, electronics, shape, airflow surfaces, reinforcing structures, explosives and the like, which may carry out a variety of functions. In addition, the present subject matter may be practiced in conjunction with any number of devices, and the systems described are merely exemplary applications.

Figure 1A:
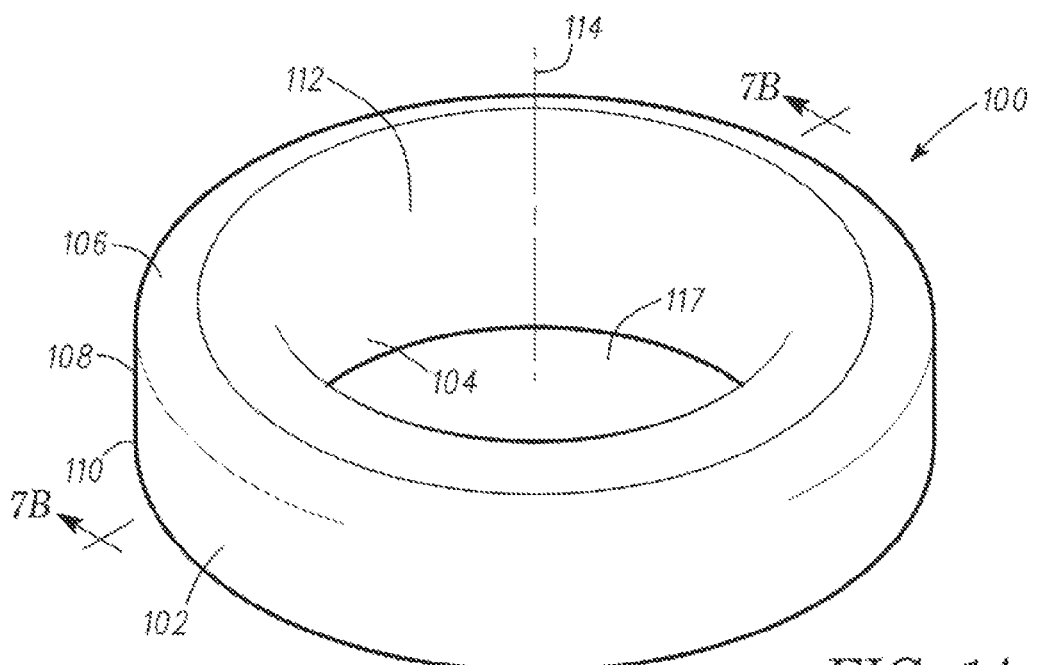
FIG. 1A is a perspective view showing one example of a toroidal pressure vessel with a planar exterior face.

FIGS. 1A and 1B show one example of a pressure vessel 100, such as a toroid pressure vessel. Referring first to FIG. 1A, the pressure vessel 100 includes a toroid body 102 circumscribed around a toroid body longitudinal axis 114. The toroid body 102 in one example is formed with an inner shell 104 coupled along an outer shell 106. The inner and outer shells 104, 106 contain the gas within the toroid body 102 and act as structural members as described herein. As shown, the toroid body 102 includes a toroid outer perimeter 108 extending around the outer shell 106. At least a portion of the outer shell 106 includes a planar exterior face 110 (e.g., a flat surface) extending along a portion of toroid outer perimeter 108. As shown in FIG. 1A for instance, the planar exterior face 110 extends along the entire toroid outer perimeter 108 and thereby provides a substantially flat and planar exterior surface to the toroid body 102. In another example, the planar exterior face 110 extends along only a portion of the toroid outer perimeter 108, for instance in separate increments, along an arc of between 1 and 360 degrees and the like. A tapered interior face 112 extends along the inner shell 104 and circumscribes a toroid orifice 117 extending through the toroid body 102. A tapered interior face 112 (e.g., a planar tapered face, curved face, semicircular face and the like) tapers toward a midline of the inner shell 104. The toroid outer perimeter 108 including the planar exterior face 110 are described in further detail below.

In one example the toroid body 102 is constructed with one or more materials including, but not limited to, metals, composites and the like incorporated in the inner and outer shells 104, 106. In one example, the inner and outer shells 104, 106 are constructed with carbon steel, stainless steel, titanium and the like. The inner and outer shells are constructed with processes including, but not limited to, machining, molding, cold forming, rolling and the like. As will be described in further detail below the inner and outer shells 104, 106 are coupled together with welds extending along edges of the inner and outer shells 104, 106. The pressure vessel 100 including the toroid body 102 is constructed with robust structurally sound materials such as carbon steel, titanium and the like to contain therein fluids under high pressure. As will be described in further detail below the pressure vessel 100 includes a variety of features including the inner and outer shells 104, 106 and a wrapping assembly configured to support the inner and outer shells 104, 106 against bursting and bulging forces developed from the pressurized fluid within the vessel 100 (e.g., nitrogen and the like at pressures of 5000 to 8000 psi). The inner and outer shells 104, 106 as well as the wrapping assembly described below support the toroid body and maintain the toroid body 102 in the shape shown in FIG. 1A.

Referring now to FIG. 1B the pressure vessel 100 is shown in cross section. The outer shell 106 extends from an outer shell midline 116 to upper and lower rounded corners 120, 122. The inner shell 104 meets the outer shell 106 at the upper and lower rounded corners 120, 122 and extends from the outer shell toward an inner shell midline 118 (also shown in FIG. 1B). As previously described, the toroid outer perimeter 108 formed by the outer shell 106 includes a planar exterior face 110. The planar exterior face 110 circumscribes the perimeter 108 and has a substantially cylindrical shape (as shown in FIG. 1B) with a longitude axis substantially coincident with the toroid body longitudinal axis 114 shown in FIGS. 1A, 1B. As previously described, the inner shell 104 has a tapered interior face 112 tapering toward the inner shell midline 118.

In combination with the upper and lower rounded corners 120, 122 the inner and outer shells 104, 106 form a D-shaped profile 126. As previously described the outer surface of the D-shaped profile 126 includes the planar exterior face 110 and the interior portion of the D-shaped profile 126 includes the tapered interior face 112 tapering toward the inner shell midline 118 (e.g., a curved or semi-circular surface). Stated another way, the toroid outer perimeter 108 shown in FIGS. 1A and 1B forms one portion of the D-shaped profile 126 and a toroid inner perimeter 128 including the tapered interior face 112 extending along the inner shell 104 forms another portion of the D-shaped profile 126. As will be described in further detail below, the provision of the D-shaped profile 126 with the planar exterior face 110 and tapered interior face 112 snugly fits the pressure vessel 100 within the space allotted in a rocket motor having a composite shape corresponding to the D-shaped profile 126. Stated another way the D-shaped profile 126 enhances the volume of gas storage allowed for the pressure vessel 100 relative to previous designs (e.g., circular toroid designs) by providing a shape that readily fills a corresponding space within the rocket motor. Conversely, the D-shaped profile 126 including the planar exterior face 110 maximizes the storage capacity of the pressure vessel 100 and facilitates the use of a smaller pressure vessel 100 relative to a similar circular section toroid otherwise used within a rocket motor section. That is to say, a smaller pressure vessel 100 including the D-shaped profile 126 in contrast to a circular section toroid stores the same volume as the circular toroid. The pressure vessel 100 (with the D-shaped profile 126) more efficiently uses the space within the rocket motor section because the planar exterior face 110 snugly positions the vessel along the cylindrical shroud of the motor section.

Referring again to FIG. 1B, the pressure vessel 100 includes in another example a wrapping assembly 124 extending around the D-shaped profile 126. The wrapping assembly 124 includes multiple layers (e.g., a laminate) of interior and exterior wrapping courses configured to enhance the strength of the inner and outer shells 104, 106. As will be described in further detail below, the interior and exterior wrapping courses included in the wrapping assembly 124 are in one example helically wrapped around the D-shaped profile 126. For instance, the interior and exterior wrapping courses extend helically around the inner and outer shells 104, 106 and provide a helically extending covering over the toroid inner and outer perimeters 128, 108. The wrapping assembly 124 further includes a support belt 200 positioned around the toroid outer perimeter 108. As shown in FIG. 1B the support belt 200 is positional along the planar exterior face 110 of the outer shell 106. The support belt 200 extends around the toroid outer perimeter 108 and provides a structural support (e.g., a brace) to the outer shell 106. The support belt 200 enhances the strength of the pressure vessel 100 against bulging forces developed by pressurized fluid within the pressure vessel 100 that cause tensile stress (e.g., hoop stress) along the toroid outer perimeter 108. The belt 200 braces the outer shell 106 including the planar exterior face 110 against forces that would otherwise cause bulging of the outer shell into a circular shape similar in some regards to the tapered interior face (e.g., a semi-circle) shown in FIG. 1B. The toroid body 102 is thereby readily positioned within a rocket motor section with the toroid outer perimeter 108 (e.g. a planar outer perimeter) adjacent to and engaged along a cylindrical shroud of a rocket motor section. Further the support belt 200 braces the pressure vessel along the toroid outer perimeter against the tendency of a toroid body to straighten under pressure into a cylindrical configuration for instance the tendency of a toroid to fracture along a section and assume a more cylindrical shape.

Figure 2:
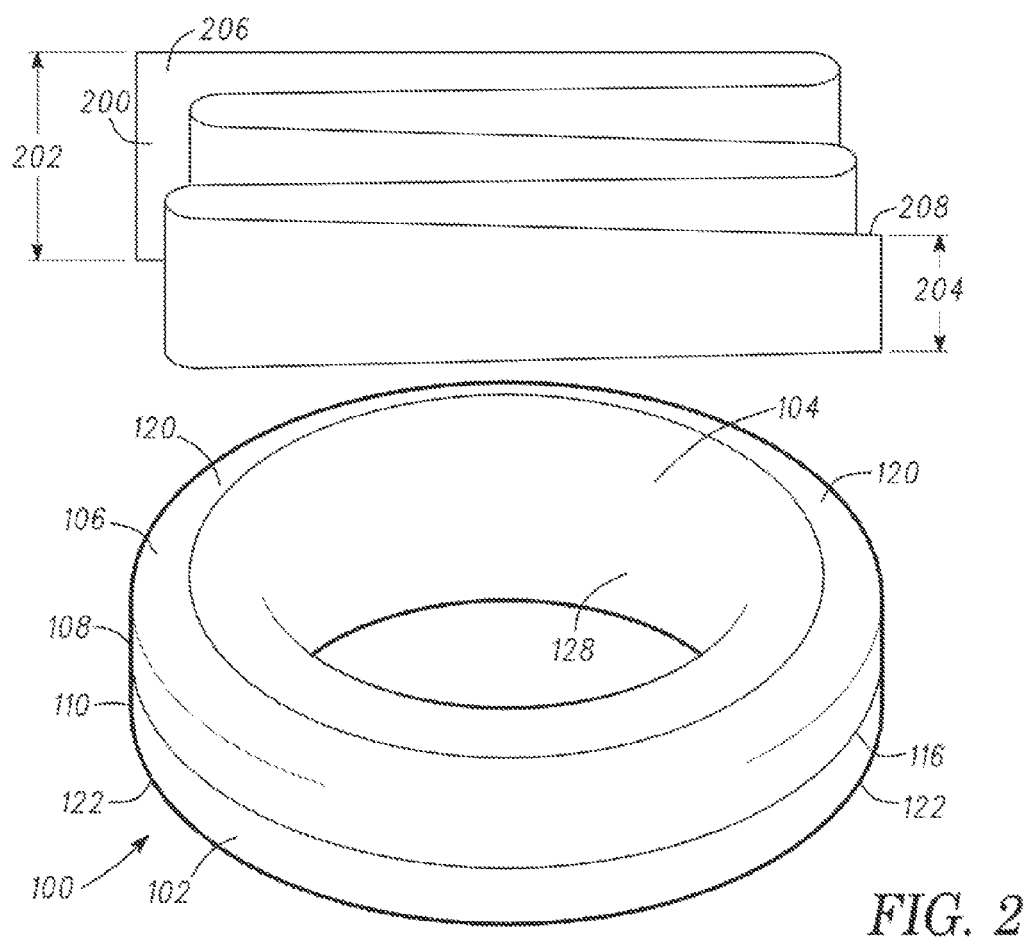
FIG. 2 is an exploded view of the toroidal pressure vessel of FIG. 1A with a support belt in an unwrapped configuration.

FIG. 2 shows an exploded view of the pressure vessel 100 with the support belt 200 spaced from the toroid body 102.

As shown the support belt 200 extends from a first belt end 206 to a second belt end 208. The first belt end 206 shows the support belt 200 with a first belt width 202 greater than a second belt width 204 shown at the second belt end 208. The support belt 200 tapers from the first belt end 206 to the second belt end 208. In one example, the support belt 200 tapers in a gradual manner for instance the support belt 200 tapers from the first belt width 202 to the second belt width 204 gradually along the length of the support belt 200. In another example the support belt 200 tapers at set locations along the support belt 200. For instance a first portion (e.g., the equivalent of one hoop around the body 102) of the support belt extends along the support belt 200 at a first belt width 202 and then tapers at one or more intermediate locations between the first and second ends 206, 208 to various intermediate belt widths over another portion of the support belt (equivalent to one or more hoops). Yet another portion of the support belt 200 near the second belt end 208 extends to the second belt end 208 and is at the second belt width 204 (e.g., the equivalent to the last hoop of the support belt around the toroid body 102). That is to say, the later portions of the support belt 200 extending to the second belt end 208 taper or neck down incrementally to the second belt width 204 at the second belt end 208. In the configuration shown in FIG. 2 the support belt 200 has a trapezoidal configuration with the first belt width 202 at the first belt end 206 and the second belt width 204 at the second belt end 208 with a gradual taper of the support belt 200 therebetween. As will be described in further detail below wrapping of the trapezoidal support belt 200 around the toroid outer perimeter 108 for instance along the planar exterior face 110 provides a gradual taper along the edges of the support belt 200 when the support belt is wrapped multiple times over itself (e.g., as hoops) along the toroid outer perimeter 108.

As previously described the support belt 200 extends along the toroid outer perimeter 108 and provides support to the outer shell 106 along the toroid outer perimeter. As shown for instance in FIG. 1B the support belt 200 extends along the planar exterior face 110 from the outer shell midline 116 (also shown in FIG. 2) to the upper and lower rounded corners 120, 122. That is to say, with the support belt 200 shown in FIG. 2 the belt is wrapped annularly around the toroid outer perimeter and thereby placed on the planar exterior face 110. As will be described in further detail below by using a trapezoidal piece of fabric as shown in FIG. 2 annular placement of the support belt 200 along the toroid outer perimeter 108 tapers the support belt 200 near the upper and lower rounded corners 120, 122 and facilitates the gradual transition of any exterior wrapping course extending over the support belt 200.

The support belt 200 in one example is constructed with, but not limited to, a fabric having a plurality of carbon fibers woven together at relative angles of 0 and 90 degrees. In one example the carbon fibers are oriented relative to the toroid outer perimeter with carbon fibers extending coincidentally with the toroid outer perimeter (e.g. the fibers extend along the toroid outer perimeter in a line parallel to the outer shell midline 116) and another set of carbon fibers woven into the support belt 200 extends orthogonally relative to the outer shell midline 116 (e.g. parallel to the toroid body longitudinal axis 114 shown in FIGS. 1A, 1B). In another example, the support belt 200 includes a fabric constructed with carbon fibers extending at angles of 45 degrees relative to the outer shell midline 116. That is to say carbon fibers are woven at angles of 0 and 90 degrees relative to each other and the fabric is canted so the 0 and 90 degree fibers are at 45 degree angles relative to the outer shell midline 116.

Alternatively, the fabric with fibers having orientations of 0 and 90 degrees is oriented at any angle relative to the outer shell midline 116 between 0 and 90 degrees. Optionally, the carbon fibers are impregnated within a resin matrix before adhesion to the toroid body 102. In another option, the carbon fibers are applied in a similar manner to carbon fiber tow (e.g., a woven fabric but without resin) and adhered to the toroid body.

In one example, the support belt 200 including for instance carbon fibers as described above is coupled with the toroid body 102 by applying an adhesive to the carbon fibers before or after wrapping of the support belt 200 around the toroid outer perimeter 108. In another example, before application to the toroid body 102 the support belt 200 is dipped in adhesive and annularly wrapped around the toroid body 102 to position the support belt 200 as shown in FIG. 1B. In still another example the support belt 200 is annularly wrapped around the toroid body 102 fully or partially and then dipped within an adhesive to adhere that portion of the support belt 200 positioned along the toroid outer perimeter 108. The process is then repeated after wrapping more of the support belt 200 around the toroid outer perimeter 108. For instance, each successive pass of the support belt annularly around the toroid outer perimeter 108 is followed by dipping of the toroid body 102 into an adhesive bath to adhere the newly added portion of the support belt to the toroid body 102.

Referring again to FIG. 2, the support belt 200 is positioned along the toroid outer perimeter including the planar exterior face when installed along the toroid body 102. The planar exterior face 110 provides a stabilizing shelf for positioning of the support belt 200 thereon. The planar exterior face 110 positions the support belt 200 along a flat annular surface and substantially retains the support belt 200 along the toroid outer perimeter 108. The planar exterior face 110 thereby substantially prevents slipping of the support belt 200 relative to the planar exterior face 110 and ensures that the support belt 200 is retained along the toroid outer perimeter to provide structural support to the outer shell 106 (e.g., support against bulging forces and resulting hoop stress and maintenance of the planar exterior of the outer shell 106).

Figure 3:
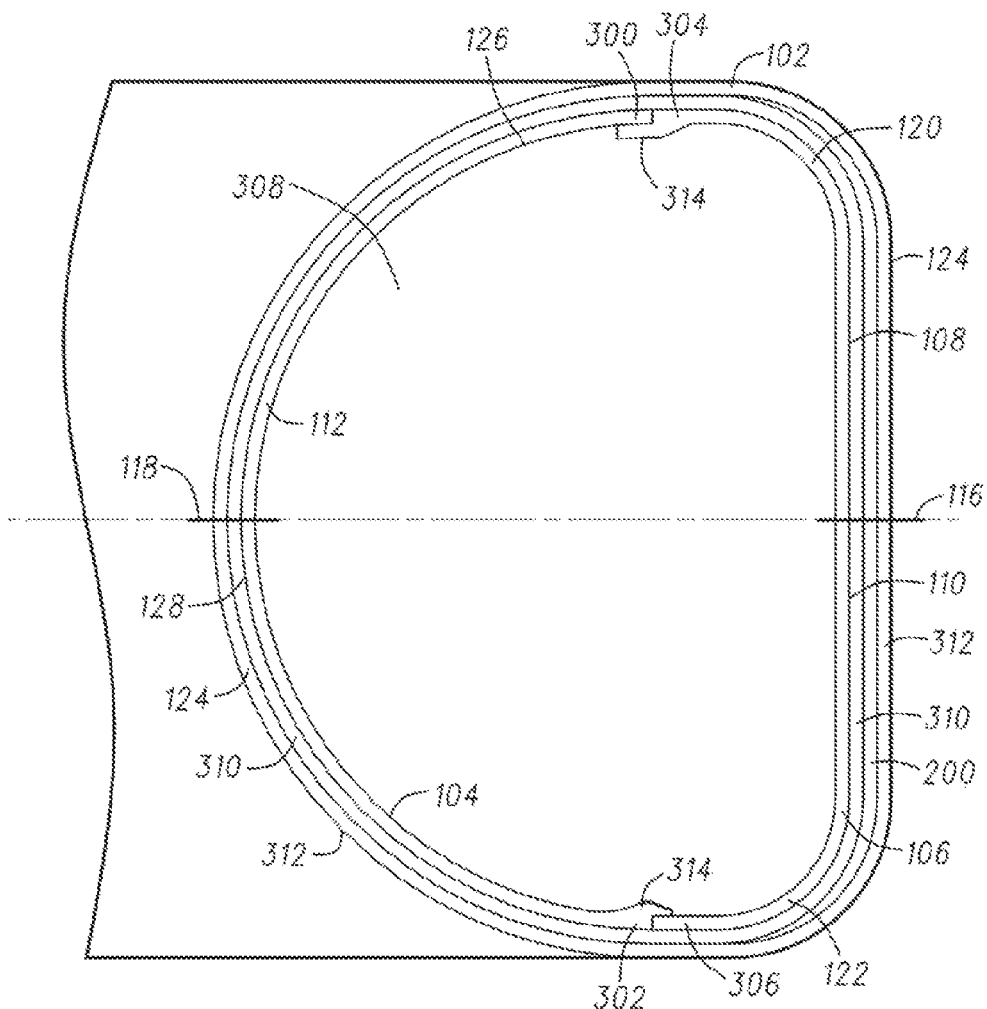
FIG. 3 is a detailed cross sectional view of the toroidal pressure vessel with one example of a wrapping assembly.

Referring now to FIG. 3 a detailed cross section of the D-shaped profile 126 shown in FIG. 1B is provided. As previously described, the toroid body 102 is formed in one example with inner and outer shells 104, 106 coupled together. Referring to FIG. 3 (and described in further detail later and shown in FIGS. 10A, B) the outer shell includes an outer shell upper edge 304 and an outer shell lower edge 306. The inner shell 104 includes an inner shell upper edge 300 and an inner shell lower edge 302. The toroid body 102 is formed by engaging the inner shell upper edge 300 with the outer shell upper edge 304 and engaging the inner shell lower edge 302 with the outer shell lower edge 306. As shown in FIG. 3 in one example the toroid body 102 includes one or more mating lips 314 extending along one or more of the upper and lower edges of the inner and outer shells 104, 106. The mating lips 314 facilitate the assembly of the inner and outer shells and as described in detail below shrouds (e.g., blocking features) may be contiguous (i.e. full 360 degrees) for welding for instance to block an electron beam used in electron beam welding, or a plurality of tabs spaced at intervals about toroid edges to facilitate self-fixturing of the inner and outer shells.

As further shown in FIG. 3 the upper edges and lower edges 300, 304 and 302, 306 are positioned at polar locations away from the midlines 116, 118 of the outer and inner shells 106, 104, respectively. The edges are positioned at the polar locations shown in FIG. 3 and away from the midlines 116, 118 to avoid positioning of the weld joints extending along the edges at points of high stress concentration such as the midlines 116, 118. Instead, the inner shell upper and lower edges 300, 302 and the outer shell upper and lower edges 304, 306 are positioned away from the midlines 116, 118 at locations that experience lower stress when the vessel interior 308 is filled with a pressurized gas such as 5,000 to 8,000 PSI nitrogen. Stated another way, the upper and lower edges 300, 302, 304, 306 are provided away from the locations of the toroid body 102 that experience the greatest stress when the vessel interior 308 is filled with a pressurized gas and the weld joints formed at the upper and lower edges 300, 302, 304, 306 are thereby isolated from the greatest stresses incident on the toroid body (e.g., at the midlines 116, 118).

Referring again to FIG. 3 the wrapping assembly 124 is shown in detail. The wrapping assembly 124 includes an interior course wrapping 310 extending around the outer and inner shells 106, 104. The previously described support belt 200 is shown positioned over the interior course wrapping 310 and extends along the planar exterior face 110 of the toroid outer perimeter 108. An exterior course wrapping 312 is positioned over the support belt 200 as well as the interior course wrapping 310. As shown in FIG. 3, the exterior course wrapping 312 extends around the inner and outer shells 104, 106 in a substantially similar manner to the interior course wrapping 310. In one example the wrapping assembly 124 includes each of the interior course wrapping and the exterior course wrapping 310, 312 as well as the support belt 200. In yet another example, the wrapping assembly 124 includes one or more of the interior course wrapping, the exterior course wrapping 310, 312 and the support belt 200.

As shown in FIG. 3, the support belt 200 is sandwiched between the interior and exterior course wrappings 310, 312 along the toroid outer perimeter 108. Optionally the wrapping assembly 124 includes multiple interior and exterior course wrappings 310, 312 and multiple support belts 200 are interposed between various courses of interior and exterior course wrappings 310, 312. In one example, an interior course wrapping 310 wraps the toroid body 102 helically and is provided (in part) along the toroid outer perimeter 108 for instance along the planar exterior face 110. The support belt 200 is thereafter annularly wound around the toroid outer perimeter 108 and extends over the interior course wrapping 310. A second interior course wrapping 310 is thereafter helically wrapped around the inner and outer shells 104, 106 and over the support belt 200. A second support belt 200 is positioned over this intermediate interior course wrapping 310. An exterior course wrapping 312 is thereafter wound around the composite assembly of the support belts 200 interposed with the interior course wrappings 310. In yet another option the wrapping assembly 124 includes a protective coating such as a fiberglass coating extending around the exterior course wrapping 312.

The interior and exterior course wrappings 310, 312 in one example are formed with but not limited to helically wrapped carbon fibers extending around the inner and outer shells 104, 106. For instance, the interior and exterior course wrappings 310, 312 include carbon fibers wrapped around the inner and outer shells 104, 106 at one or more tow angles (the angle of the helix) relative to the toroid body longitudinal axis 114 shown in FIGS. 1A and 1B. In one example the interior and exterior course wrappings 310, 312 include carbon fibers suspended within a polymer resin with a plastic coating forming an elongated strip or tape that is then helically wound around the inner and outer shells 104, 106. The carbon fiber tape is wrapped helically at a tow angle of between 5 and 15 degrees relative to the toroid body longitudinal axis 114 to facilitate overlapping of the carbon fiber tape as it is wrapped around the inner and outer shells 104, 106. In still another example, the interior and exterior course wrappings 310, 312 include carbon fiber tow (e.g. bare carbon fiber) helically wrapped around the inner and outer shells 104, 106 through an automated process. As previously described with the support belt 200, in one example the carbon fiber tape or carbon fiber tow are applied to the inner and outer shells 104, 106 and subsequently dipped within an adhesive bath (or brushed) to adhere the tape or bare carbon fiber tow to the toroid body 102 (including the inner and outer shells 104, 106 and any underlying course wrappings). In another example the carbon fiber tape or carbon fiber tow are dipped in an adhesive bath and then applied to the toroid body 102 to adhere the interior and exterior course wrappings 310, 312 with the toroid body 102. With an automated wrapping process one or more of the interior and exterior course wrappings 310, 312 are applied to the toroid body with a tow angle of between 0 and 90 degrees. With a shallow tow angle (e.g. approaching 45 to 90 degrees) gaps are formed between the carbon fiber tape or carbon fiber tow. With an automated process the continued application of fibers or tape results in complete coverage of the toroid body 102 with the interior and exterior course wrappings 310, 312 without requiring the overlapping used with tow angles of between 5 and 15 degrees.

In contrast to the interior and exterior course wrappings 310, 312 the support belt 200 as previously described and shown in FIGS. 1B and 2 is annularly wrapped around the toroid outer perimeter 108. As shown for instance in FIG. 3, the support belt 200 is positional along the planar exterior face 110 of the toroid body 102. Each of the interior and exterior course wrappings 310, 312 and the support belt 200 within the wrapping assembly 124 provides a different type of support to the toroid body 102 to ensure the toroid body 102 will both maintain the D-shaped profile 126 and be able to reliably contain a pressurized gas within the vessel interior 308.

The interior and exterior course wrapping 310, 312 for instance provide support (bracing) to the inner and outer shells 104, 106 against bursting forces such as forces caused by pressure applied radially to the toroid section. That is to say the interior and exterior course wrappings 310, 312 extend helically around each of the inner and outer shells 104, 106 and thereby provide consistent radial support to the inner and outer shells from bursting forces created by pressure applied radially to the toroid section (e.g. the D-shaped profile 126 shown in FIGS. 1B and 3). In contrast, the support belt 200 provides support to the toroid outer perimeter 108 against bulging forces applied to the toroid outer perimeter 108 that create hoop stress along the perimeter.

Further, the wrapping assembly 124 including the interior and exterior course wrappings 310, 312 and the support belt 200 each cooperate with the inner and outer shells 104, 106 to maintain the toroid body 102 in the configuration shown in FIGS. 1A and 1B. That is to say, the wrapping assembly 124 strengthens toroid body 102 and maintains the D-shaped profile 126 of the body shown in FIGS. 1B and 3. The wrapping assembly 124 thereby braces the toroid body 102 against deformation for instance along the toroid outer perimeter 108 including the planar exterior face 110 (with the support belt 200) and deformation along the toroid outer perimeter 108 and toroid inner perimeter 128 (with the interior and exterior course wrappings 310, 312). The D-shaped profile 126 is thereby maintained. Further the support belt 200 of the wrapping assembly 124 further assists in maintaining the torus shape of the toroid pressure vessel 100 and substantially prevents the tendency of the toroid body 102 to straighten under pressure into a cylindrical configuration (e.g. the tendency of a toroid to split along the D-shaped profile section and assume a more cylindrical shape much like an elongate balloon when wrapped in a toroid configuration and allowed to freely straighten out and resume a cylindrical configuration).

As previously described the support belt 200 cooperates with the outer shell 106 to maintain the flat planar shape of the planar exterior face 110 and support the toroid outer perimeter against bulging forces. In one example, the outer shell 106 is constructed with a smaller thickness than otherwise required without the support belt 200. That is to say, by providing the support belt 200 (with a less dense material such as carbon fiber) the outer shell 106 with the support belt 200 is lighter than an otherwise thicker outer shell needed without the support belt 200. For instance, the inner and outer shells 104, 106 are constructed with substantially the same thickness instead of the outer shell being thicker than the inner shell. The combination of the support belt 200 and the thinner outer shell 106 thereby realizes a significant weight savings relative to previous pressure vessel designs utilizing a thicker outer shell to brace the pressure vessel against hoop stresses cause by bulging forces within the vessel interior.

Referring again to FIG. 3, the planar exterior face 110 provides a flat support shelf configured to stabilize the support belt 200 when the support belt 200 is annularly wrapped around the toroid outer perimeter 108. That is to say the planar exterior face 110 provides a flat annular support that stabilizes the support belt 200 along the toroid outer perimeter 108 and prevents slipping (decoupling) while the pressure vessel 100 is filled with a pressurized gas. In another example, where the support belt 200 is included in the wrapping assembly 124 the interior and exteriors course wrappings 310, 312 engage with the support belt 200 and further stabilize the support belt along the planar exterior face 110. That is to say, the interior and exterior course wrappings 310, 312 hold the support belt 200 therebetween and anchor the support belt 200 relative to the toroid outer perimeter 108. The interior and exterior course wrappings 310, 312 cooperate with the planar exterior face 110 to substantially prevent decoupling of the support belt 200 through slipping upwardly or downwardly along the outer perimeter 108.

Figure 4:
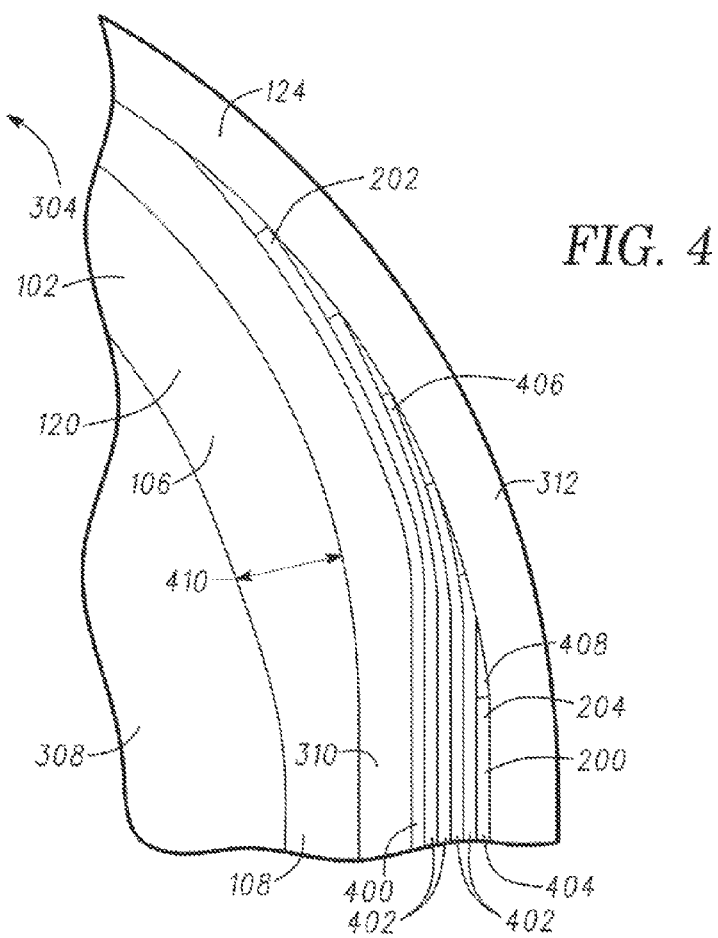
FIG. 4 is a detailed cross sectional view of one of the rounded corners shown in FIG. 3.

FIG. 4 is a detailed cross sectional view of the upper rounded corner 120 of the outer shell 106. As shown in FIG. 4, the wrapping assembly 124 is provided with the interior and exterior course wrappings 310, 312 extending along the outer shell 106 (the inner shell 104 is shown covered by the wrapping assembly in FIG. 3). Additionally, the support belt 200 is interposed between the inner and exterior course wrappings 310, 312 along the toroid outer perimeter. FIG. 4 shows the tapered belt edge 406 of the support belt 200 extending partially over the upper rounded corner 120. As previously described, the interior and exterior course wrappings 310, 312 extend over the toroid inner perimeter 128 and toroid outer perimeter 108. The tapered belt edge 406 of the support belt 200 is provided to substantially fill a wrapping void 408 created by the interposing of the support belt 200 between the interior and exterior course wrappings 310, 312 along the toroid outer perimeter. Without the tapered belt edge 406 in one example the wrapping void 408 would provide an opening between the interior and exterior course wrappings 310, 312 requiring filling with a material such as adhesive, resin and the like.

As previously described, in one example the support belt 200 includes a trapezoidal extending belt (see FIG. 2). When wrapped around the toroid outer perimeter 108 the trapezoidal shape of the support belt 200 allows the support belt to gradually taper from the toroid outer perimeter 108 over the upper rounded corner 120 as shown in FIG. 4. For instance, the inner belt layer 400 of the support belt 200 corresponds with the first belt end 206 having the first belt width 202 shown in FIG. 2. The intermediate belt layers 402 correspond to the intermediate portions of the support belt 200 having a width somewhere between the first belt width 202 and the second belt width 204 shown in FIG. 2. As shown in FIG. 4 the intermediate belt layers 402 have a progressively smaller width and thereby create the tapered belt edge 406 as the layers are gradually applied over top of the wider inner belt layer 400. After application of the intermediate belt layers 402 the outer belt layer 404 is provided thereon and adhered over the intermediate belt layers. The outer belt layer 404 in one example corresponds to the portion of the support belt 200 adjacent to the second belt end 208 having the second belt width 204. As shown in FIG. 2 the second belt width 204 is the narrowest portion of the support belt 200 and overlies the other layers to form the thickest portion of the support belt 200 when layered in combination. In one example the lower rounded corner 122 shown in FIG. 3 includes a similar tapered belt edge 406 formed with the inner belt layer 400, the intermediate belt layers 402 and the outer belt layer 404. The tapered belt edges 406 at the upper and lower rounded corners 120, 122 substantially fill the wrapping void 408 between the interior and exterior course wrappings 310, 312 and support the overlying exterior course wrapping 312. The exterior course wrapping 312 thereby reliably provides support around the full D-shaped toroid section 126. Optionally, the tapered belt edges 406 provide minimal hoop strength relative to the portion of the support belt 200 overlying the planar exterior face 110. One skilled in the art will understand that notching, darting, fiber trimming or other techniques may be necessary to permit the tapered belt edge 406 of the support belt 200 to drape around the upper rounded corner 120 of interior course wrapping 310 without wrinkling. In another option, the tapered belt edges 406 (e.g., carbon fibers) are taut around the upper and lower rounded corners and provide some measure of hoop strength to the outer shell 106 along the upper and lower rounded corners 120, 122.

In another example, the support belt 200 includes a plurality of individual continuous loops of fabric positioned sequentially around the toroid outer perimeter 108. For instance, each of the inner belt, the intermediate belt, and outer belt layers 400, 402, 404 are comprised of individual fabric hoops such as carbon fiber hoops sequentially positioned around the toroid outer perimeter 108. The inner belt layer 400 is formed with a first belt of material having a first width similar to the first belt width 202 shown in FIG. 2 while the intermediate belt layers 402 are constructed with continuous support belt loops having gradually decreasing belt widths. Finally the outer belt layer 404 applied over top of the intermediate belt layers 402 has a second belt width substantially corresponding to the second belt width 204 shown in FIG. 2. Using continuous support belt loops with varied widths similarly forms the tapered belt edge 406 shown in FIG. 4. In still another example, carbon fiber tow (bare carbon fiber) is annularly wrapped along the toroid outer perimeter 108. As described above, the tow includes adhesive pre-applied before winding or the pressure vessel is dipped or brushed with adhesive after application of the fibers to the vessel. Optionally, the carbon fiber tow is annularly wrapped to provide the varied thickness shown in FIG. 4. For instance, the carbon fiber tow is annularly wound in layers of fibers along the toroid outer perimeter 108 and the planar exterior face 110 to provide the thickest portion of the support belt 200. In another example, the carbon fiber tow is annularly wrapped along the upper and lower rounded corners 120, 122 with gradually decreasing thickness to provide tapered edges (much like the tapered belt edges 406 shown in FIG. 4).

Figure 5:
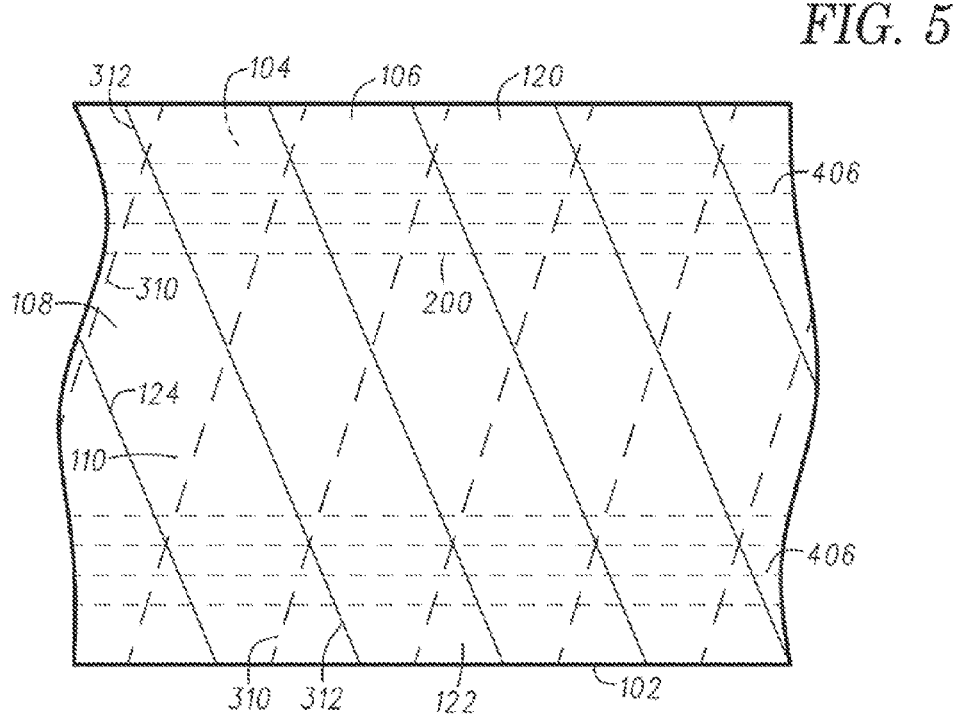
FIG. 5 is a side view of the toroid pressure vessel of FIG. 3 with the exterior course wrapping visible and the support belt and the interior course wrapping in phantom lines.

Referring now to FIG. 5, the wrapping assembly 124 is shown with the interior and exterior wrapping courses 310, 312 extending helically along the outer shell 106 (e.g. the interior and exterior course wrappings 310, 312 helically extend around the inner shell 104 as previously described). As shown in FIG. 5 in one example the exterior course wrappings 312 are provided at a first tow angle of 90 degrees relative to the interior course wrapping 310. Optionally, the interior and exterior course wrappings 310, 312 extend helically around the inner and outer shells 104, 106 at substantially the same tow angle. As previously described the support belt 200 is positioned around the toroid outer perimeter 108 of the outer shell 106. In one example the support belt 200 includes the tapered edges 406 as shown in FIG. 4 and presented again in FIG. 5. The wrapping assembly 124 includes multiple layers of interior and exterior course wrappings 310, 312 in combination with the support belt 200 sandwiched therebetween. As previously described and described in further detail below the helically wound interior and exterior course wrappings 310, 312 and the annularly wrapped support belt 200 (both shown in FIG. 5) cooperate to provide enhanced strength and support to the pressure vessel 100 against bursting and bulging forces applied through pressurized gas held within the vessel interior.

Figure 6:
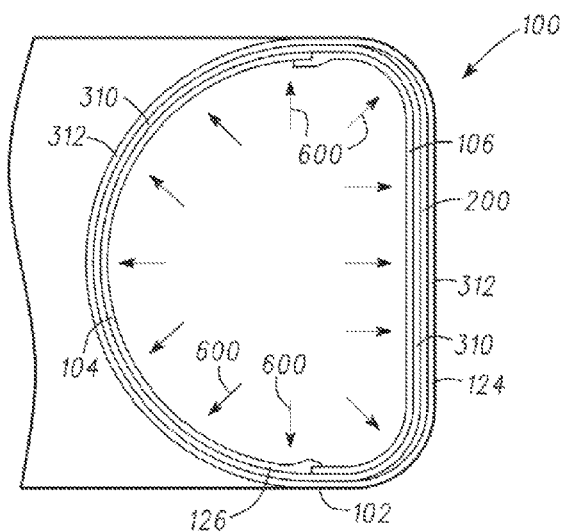
FIG. 6 is a detailed cross sectional view of the toroidal pressure vessel of FIG. 1A showing a force vector diagram of toroid section radial stress.

FIG. 6 is a cross sectional diagram of the pressure vessel 100 showing the D-shaped profile 126. FIG. 6 further shows a diagram of radial bursting force applied to the inner and outer shells 104, 106 along the D-shaped profile because of the pressurized fluid contained within the pressure vessel 100. Referring to FIG. 6 the force vectors for the bursting force 600 are distributed across the inner and outer shells 104, 106. As previously described the wrapping assembly 124 is applied around the inner and outer shells 104, 106 in part to brace the inner and outer shells against the bursting force 600 that generates toroid section radial stress within the shells. The wrapping assembly 124 (as shown in FIG. 5) includes the interior and exterior course wrappings 310, 312 extending helically along each of the inner and outer shells 104, 106. The helically extending wrappings reinforce the inner and outer shells 104, 106 and cooperate with the shells to brace the toroid body 102 against the bursting force 600. Stated another way, the interior and exterior course wrappings 310, 312 provide radial bracing to the inner and outer shells 104, 106 around the entire D-shaped profile 126 of the toroid body 102 against the radial bursting force 600.

Figure 7A:
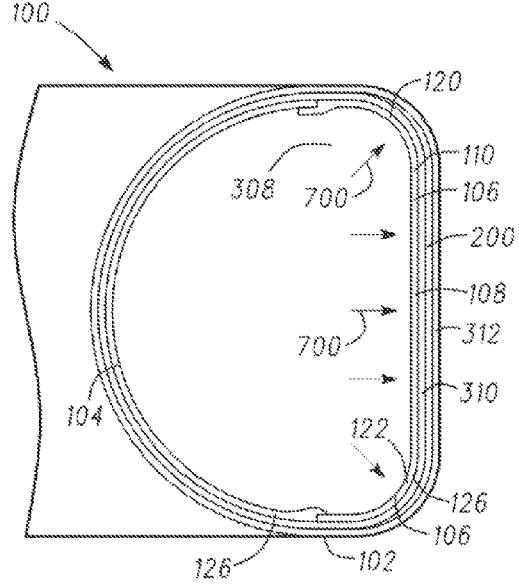
FIG. 7A is a detailed cross sectional view of the toroidal pressure vessel of FIG. 1A showing a force vector diagram of toroid hoop stress.
Figure 7B:
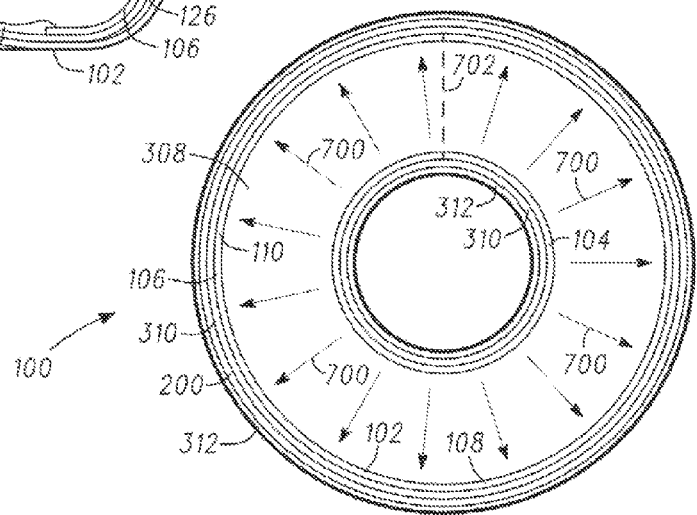
FIG. 7B is a cross sectional view of the toroidal pressure vessel of FIG. 1A taken along line 7B-7B showing a force vector diagram of toroid hoop stress.

Referring now to FIGS. 7A and 7B, the pressure vessel 100 is shown with a bulging force 700 applied along the toroid outer perimeter 108. In a similar manner to the bursting force 600 shown in FIG. 6, the bulging force 700 acts on the toroid body because of the pressurized fluid held within the vessel interior 308. Referring first to FIG. 7A, the bulging force 700 is shown applied along the toroid outer perimeter 108. As previously described the D-shaped profile 126 of the toroid body 102 provides a planar exterior face 110. The bulging force 700 is applied along the planar exterior face 110 as well as the upper and lower rounded corners 120, 122 of the outer shell 106. The support belt 200 is provided along the toroid outer perimeter 108 including the planar exterior face 110 to support and brace the outer shell 106 against the bulging force 700. Stated another way, the support belt braces the outer shell 106 against tensile stresses annularly applied along the toroid outer perimeter 108. Further, the support belt 200 cooperates with the outer shell 106 to substantially prevent bulging of the toroid outer perimeter otherwise caused by high pressure fluids contained within the vessel interior 308.

Referring now to FIG. 7B, the toroid body 102 is shown in cross section. The bulging forces 700 are again shown within the vessel interior 308. As shown in FIG. 7B the bulging force 700 is directed outwardly toward the toroid outer perimeter 108 and the planar exterior face 110 extending around at least a portion of the toroid outer perimeter. Application of the bulging force 700 to the toroid outer perimeter 108 creates toroid hoop stress within the toroid outer perimeter 108. The toroid hoop stress extends annularly along the toroid outer perimeter 108. As previously described and now shown in FIG. 7B the hoop stress within the toroid outer perimeter 108 applies stress to the toroid body 102 for instance along a toroid section line 702 as shown in FIG. 7B. In an example where the toroid body 102 is split open by the bulging force 700 the hoop stress caused by the bulging force 700 biases the toroid body 102 to assume an unrolled or cylindrical configuration (e.g., like a donut or a bagel fracturing along the section line 702 and then unrolling into a substantially cylindrical configuration). By providing the support belt 200 around the toroid outer perimeter 108 the outer shell 106 is braced and supported against the bulging force 700 and the corresponding hoop stress. The support belt 200 thereby substantially prevents fracture of the toroid body 102 along the toroid section line 702. Stated another way, the support belt 200 extends annularly around the toroid outer perimeter 108 and, because of the annularly extending configuration of the support belt 200, counteracts the toroid hoop stress and prevents fracture along the section line 702.

Referring again to FIG. 7A, as previously described the support belt 200 provides support to the toroid outer perimeter 108 and counteracts bulging force 700 applied by the pressurized fluid within the vessel interior 308. The support belt 200 further supports the planar exterior face 110 and substantially prevents bulging of the planar exterior face 110 outwardly from the configuration shown in FIG. 7A. That is to say, the support belt 200 assists in maintaining the shape of the D-shaped profile 126 including the planar exterior face 110 having the flat configuration shown in FIG. 7A. In one example, the toroid body 102 is positioned within a rocket motor section. When positioned within a motor the toroid body 102 is positioned adjacent to a cylindrical shroud housing the rocket motor section. For instance, the planar exterior face 110 and the exterior course wrapping 312 extending along the planar exterior face 110 are positioned adjacent and along the cylindrical shroud. By providing the support belt 200 the planar exterior face 110 and the overlying exterior course wrappings 312 are maintained in the substantially planar configuration shown in FIG. 7A thereby ensuring the D-shaped profile is sustained and deflection of the cylindrical shroud of the rocket motor by the toroid body 102 is substantially prevented. In a similar manner, the interior and exterior course wrappings 310, 312 maintain the shape of the D-shaped profile 126 shown in FIG. 6 by substantially counteracting bursting force 600 applied to the inner and outer shells 104, 106. Stated another way, the interior and exterior course wrapping 310, 312 cooperate with the inner and outer shells 104, 106 to maintain the toroid body 102 in the configuration shown in FIG. 6 without substantial deflection or deformation of the toroid body.

Figure 8:
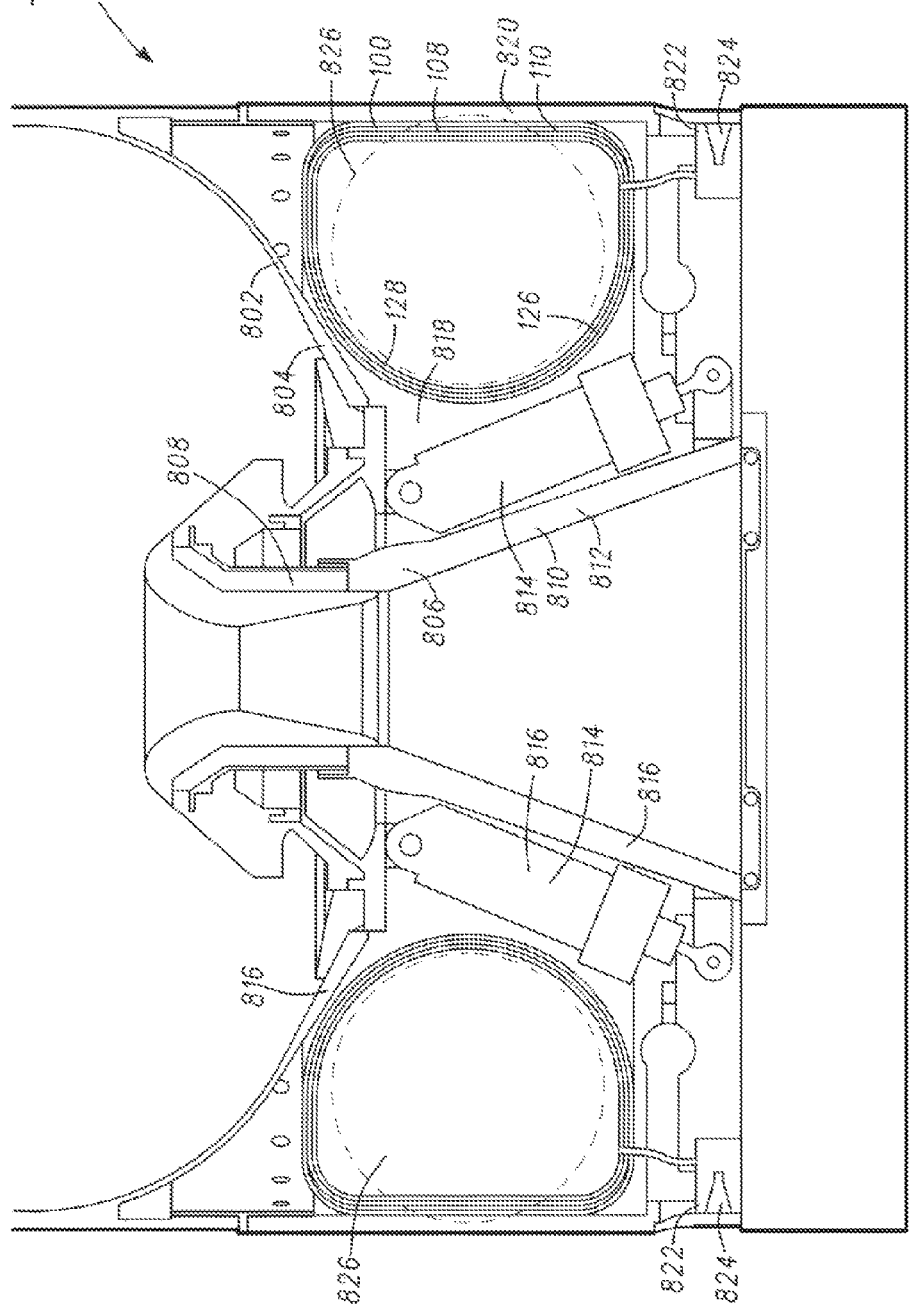
FIG. 8 is a cross sectional view of one example of a rocket motor section including a toroidal pressure vessel.

FIG. 8 shows a schematic diagram of a rocket motor section 800 sized and shaped to house a pressure vessel such as the pressure vessel 100 described previously herein. The rocket motor 800 includes a motor section 802 positioned within a cylindrical shroud 820. The motor section 802 includes a motor section tapered end 804 (e.g., a dome, cone and the like) tapering toward a rocket nozzle 806. In one example, the motor section tapered end 804 is coupled with the rocket nozzle 806 at a nozzle coupling 808. A nozzle frustum 810 extends from the rocket nozzle 806 toward a nozzle base 812. As shown in FIG. 8, the nozzle frustum 810 tapers from the nozzle base 812 toward the nozzle coupling 808 and the motor section tapered end 804. The rocket nozzle 806 is supported by a gimble assembly including one or more hydraulic actuators 814 coupled along the nozzle frustum 810. The cylindrical shroud 820 extends from the motor section 802 and over the rocket nozzle 806. As shown in FIG. 8, a pressure vessel void 818 is formed between the rocket nozzle 806, the motor section 802 and the cylindrical shroud 820. The pressure vessel void 818 is an annular void extending around the rocket nozzle 806 and positioned adjacent to the motor section 802.

The pressure vessel 100 in one example is provided within the rocket motor 800 to provide a source of pressurized gas, such as nitrogen, to systems of the rocket motor 800 including an attitude control system (ACS) 822. The ACS 822 includes one or more ACS nozzles 824 positioned around the cylindrical shroud 820. The pressure vessel 800 is connected with the ACS 822 through tubing and the like to selectively supply pressurized gas through the ACS nozzles 824 according to manifolds and valve controls provided in the rocket motor 800.

Referring again to FIG. 8, the motor section tapered end 804, the nozzle frustum 810 and the cylindrical shroud 820 cooperate to form a composite shape 816 corresponding to the profile of the pressure vessel void 818. In one example, the composite shape 816 includes the hydraulic actuators 814. As shown in FIG. 8, the hydraulic actuators 814 extend along the nozzle frustum 810 and thereby provide a corresponding shape to the nozzle frustum 810 (e.g., a tapered shape). As shown in FIG. 8, the pressure vessel 800 fills the pressure vessel void 818 and closely corresponds to the composite shape 816 formed by one or more of the motor section tapered end 804, the nozzle frustum 810 and the cylindrical shroud 820. The D-shaped profile 126 of the pressure vessel 100 is sized and shaped to substantially fill the pressure vessel void 818 and thereby maximize the storage capacity of the pressure vessel 100 or facilitate the use of a smaller pressure vessel 100 having a substantially equal storage capacity to a circular cross section toroid pressure vessel positioned within the pressure vessel void 818. For instance, the toroid outer perimeter 108 including the planar exterior face 110 closely matches and is adjacent to the cylindrical shroud 800. Similarly, the toroid inner perimeter 128 tapers (is curved or semi-circular, has a linear taper and the like) in a corresponding fashion to the motor section tapered end 804 and the nozzle frustum 810.

For comparison purposes, a circular toroid profile 826 sized and shaped to fit within the pressure vessel void 818 is shown in phantom lines in FIG. 8. As shown, the pressure vessel 100 more closely fits to the composite shape 816 extending around the pressure vessel void 818. The pressure vessel 100 with a D-shaped profile 126 is thereby able to more fully fill the pressure vessel void 818 and maximizes the storage capacity of the pressure vessel 100. Because of the circular profile 826 the circular toroid does not provide the storage capacity available with the pressure vessel 100 having the D-shaped profile 126. As shown in FIG. 8, the planar exterior face 110 of the outer shell 106 and the inner shell 104 coupled with the outer shell provide substantially more storage volume (e.g., at the upper and lower portions of the toroid) compared to the circular toroid with the profile 826. The D-shaped toroid pressure vessel 100 includes enhanced storage volume while having nearly identical inner and outer diameters relative to the diameters of the circular toroid.

Conversely, because the outer shell 106 with the planar exterior face 110 and the inner shell 104 maximize the storage volume of the pressure vessel 100 (as shown by the two profiles 126, 826 in FIG. 8) a smaller pressure vessel 100 relative to the circular sectioned toroid showed by the circular profile 826 may be used within the pressure vessel void 818. Stated another way, a pressure vessel including the D-shaped profile 126 with one or more smaller inner or outer diameters relative to the toroid with the circular profile 826 is positioned within the pressure vessel void 818. Using a smaller pressure vessel 100 with the D-shaped profile 126 more efficiently fills the space within the rocket motor 800 (e.g., by positioning the planar exterior face 110 along the cylindrical shroud 820) and minimizes the weight of the pressure vessel 100 relative to the previous pressure vessel designs having a circular profile (e.g., profile 826). Stated another way, the planar exterior face 110 minimizes the space assumed by the pressure vessel 100 within the pressure vessel void 818 relative to a larger circular toroid having an equivalent storage capacity to minimize the overall weight of the rocket and facilitate increased range, responsiveness to course corrections and adjustments, and the like.

Figure 9A:
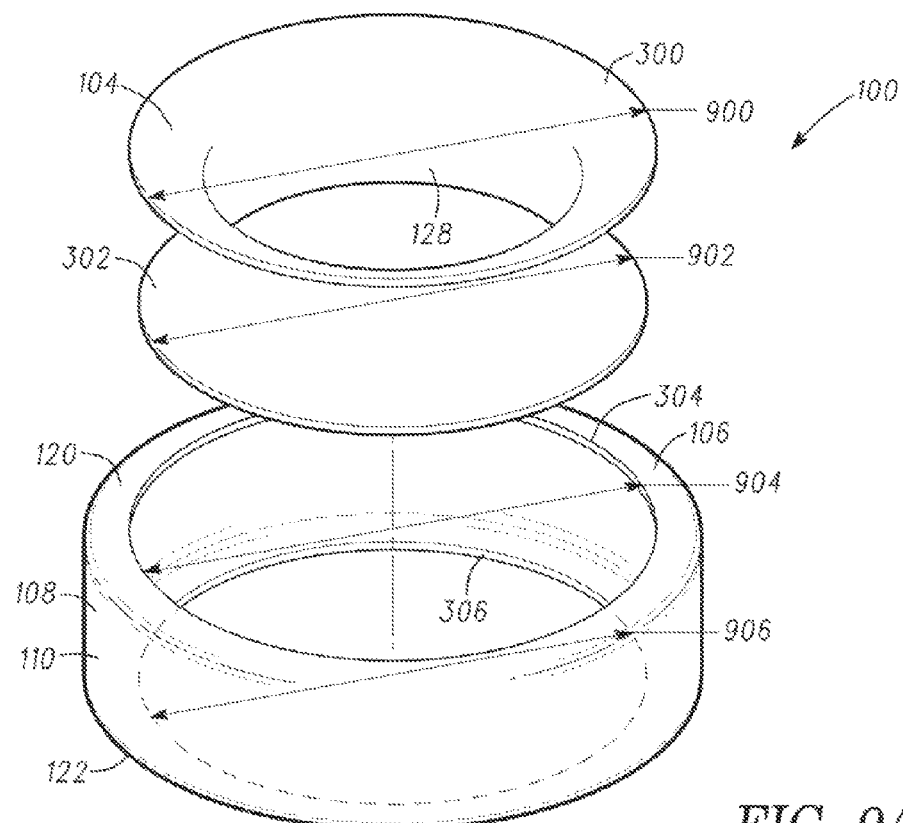
FIG. 9A is an exploded view of the toroidal pressure vessel of FIG. 1A with the inner shell removed from the outer shell.

FIG. 9A shows an assembly view of the pressure vessel 100 with the inner shell 104 positioned above the outer shell 106. As previously described, the inner shell 104 includes a toroid inner perimeter 128 having a taper. In one example, the tapered perimeter of the toroid inner perimeter 128 includes a semicircular perimeter as shown in FIG. 9A. The outer shell 106 includes a toroid outer perimeter 108 including upper and lower rounded corners 120, 122 and a planar exterior face 110 extending between the upper and lower rounded corners.

As shown in FIG. 9A, the inner shell 104 includes two diameters for two edges 300, 302. At the inner shell upper edge 300 the inner shell 104 includes an inner shell upper diameter 900. At the inner shell lower edge 302 the inner shell 104 includes an inner shell lower diameter 902. The inner shell upper diameter 900 is larger in this example than the inner shell lower diameter 902. In a similar manner to the inner shell 104 the outer shell 106 includes differing outer shell upper and lower diameters 904, 906. As shown in FIG. 9A, the outer shell upper edge 304 includes an outer shell upper diameter 904 and the outer shell lower edge 306 includes an outer shell lower diameter 906 extending across the outer shell lower edge. As will be described in further detail below, by providing different diameters between the inner and outer shell upper and lower edges 300, 302, 304, 306 assembly of the inner shell 104 to the outer shell 106 is facilitated. For instance, the inner shell 104 is easily slipped into the outer shell 106 because of the smaller inner shell lower diameter 902 relative to the outer shell upper diameter 904.

Figure 9B:
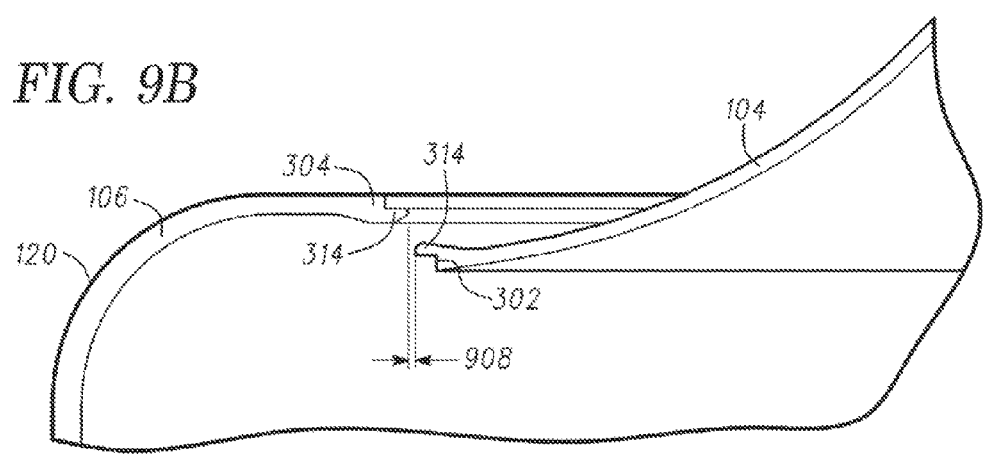
FIG. 9B is a detailed perspective view of one example of a lower edge of the inner shell nesting within the outer shell.

Referring now to FIG. 9B, the outer shell 106 and the inner shell 104 are shown in detail at the upper rounded corner 120 of the outer shell 106. As previously described, the inner and outer shells 104, 106 include varying diameters at the upper and lower edges 300, 302, 304, 306 of each of the shells. For instance, as shown in FIG. 9B at the outer shell upper edge 304 a gap 908 is formed between the outer shell upper edge 304 and the inner shell lower edge 302 (e.g., between the mating lips 314). The gap 908 between the mating lips 314 extending along each of the upper and lower edges 304, 302 facilitates the passage of the inner shell 104, for instance, the inner shell lower edge 302 past the outer shell upper edge 304 and thereby allows positioning of the inner shell 104 within the outer shell 106 without undesirable deformation or abrading engagement between the inner and outer shells 104, 106. That is to say, the inner shell 104 readily nests within the outer shell 106 because of the gap 908 formed between the outer shell upper edge 304 and the inner shell lower shell 302.

Figure 10A:
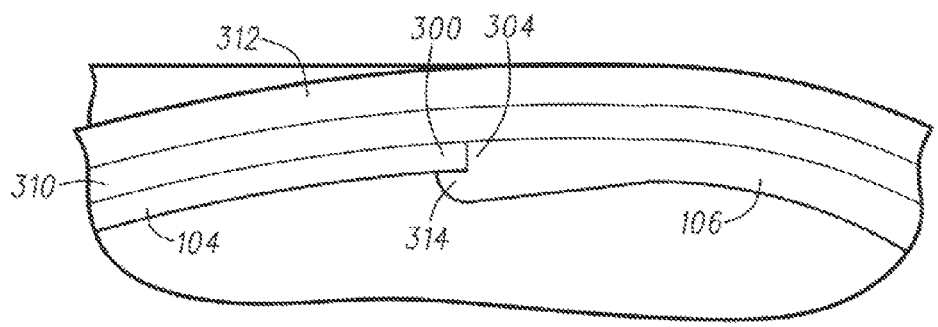
FIG. 10A is a detailed perspective view of one example of the upper edges of the inner and outer shell mated along a mating lip.
Figure 10B:
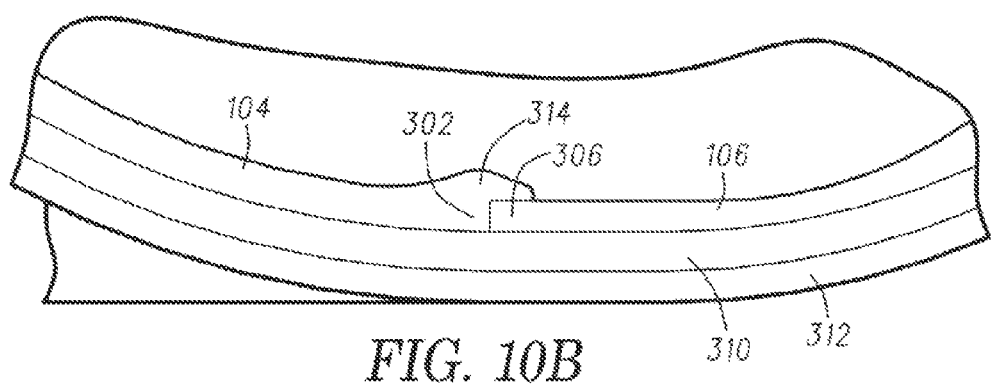
FIG. 10B is a detailed perspective view of one example of the inner edges of the inner and outer shell mated along a mating lip.

FIGS. 10A and 10B show the inner and outer shells 104, 106 in a final assembled configuration. Referring first to FIG. 10A the inner shell 104, for instance, the inner shell upper edge 300 is coupled along the outer shell upper edge 304. In one example, the inner shell upper diameter 900 shown in FIG. 9A closely matches the outer shell upper diameter 904 and facilitates the snug positioning of the inner shell upper edge 300 along the outer shell upper edge 304. Referring to FIG. 10B, the outer shell lower edge 306 is shown engaged with the inner shell lower edge 302. As with the upper diameters 900, 904 the inner shell lower diameter 902 closely matches the outer shell lower diameter 906. Because of the closely matched diameters between the inner and outer shells 104, 106 the upper and lower edges of each of the inner and outer shells closely match. In one example, nesting of one of the edges, for instance, the inner shell lower edge 302 with the outer shell lower edge 306 correspondingly positions the outer shell upper edge 304 relative to the inner shell upper edge 300. Stated another way, during assembly as the inner shell 104 is positioned within the outer shell 106 the aligning of the inner shell upper edge 300 with the outer shell upper edge 304 along the mating lips 314 correspondingly and simultaneously positions the inner shell lower edge 302 along the outer shell lower edge 306.

As previously described in one example, the pressure vessel, for instance, the inner and outer shells 104, 106 include mating lips 314 as shown in FIGS. 10A and 10B. In one example, the mating lips 314 provide assembly features that facilitate the assembly of the inner shell 104 to the outer shell 106. For instance, the mating lips 314 provide supports for positioning of the inner shell upper edge 300 and the outer shell lower edge 306 to facilitate easy coupling and alignment of the inner shell 104 to the outer shell 106. In one example, the mating lips 314 are formed on the edges of the inner and outer shells 104, 106 through spot welding of the mating lips 314 along the outer shell upper edge 304 and inner shell lower edge 302 as shown in FIGS. 10A and 10B. In still another example, the mating lips 314 are formed with a rolling process where the material along the outer shell upper edge 304 and the inner shell lower edge 302 are passed through rollers to form the mating lips 314.

Optionally, the mating lips 314 further provide a weld shroud (e.g., blocking feature). For instance, where a weld, such as an electron beam weld, is used to couple the edges of the inner and outer shells 104, 106 the mating lips 314 provide a shroud to the opposed portion of the inner and outer shells 104, 106 to prevent passage of the electron beam through the vessel 100. The mating lips 314 thereby protect the opposed surfaces of the pressure vessel 100 (e.g., the vessel interior) from unintended exposure to an electron beam otherwise used for coupling of the edges.

Figure 11:
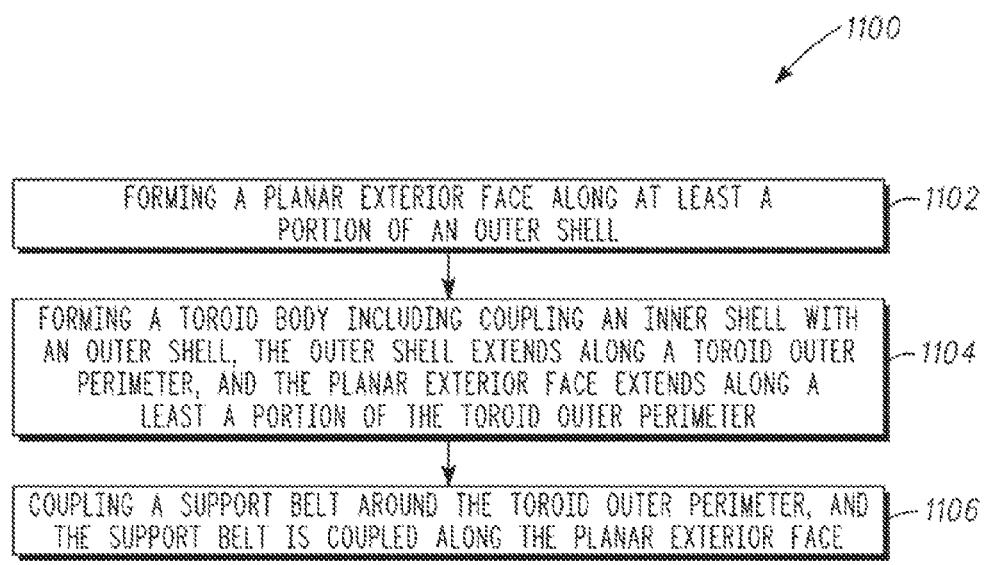
FIG. 11 is a block diagram showing one example of a method for making a pressure vessel.

FIG. 11 shows one example of a method 1100 for making a pressure vessel, such as the pressure vessel 100 shown in FIGS. 1A and 1B. Discussion of the method 1100 references features and elements previously described herein, where applicable reference numbers are provided for examples. The reference numbers provided are not intended to be limiting. Instead, the features and elements described herein include all similar features and elements within the application and their equivalents.

At 1102, the method 1100 includes forming a planar exterior face 110 along at least a portion of an outer shell 106. In one example, the planar exterior face 110 is formed with but not limited to a manufacturing process including rolling of a flat piece of metal. In another example, the planar exterior face 110 is formed through machining, molding and the like. The outer shell 106 extends along a toroid outer perimeter 108 and the planar exterior face 110 extends along at least a portion of the toroid outer perimeter 108. For instance, the planar exterior face extends along an arc between 1 and 360 degrees of the toroid outer perimeter 108. At 1104, a toroid body 102 is formed including an inner shell 104 coupled with the outer shell 106. The inner shell is formed with, but not limited to, rolling processes, machining, molding processes and the like.

At 1106, a support belt 200 is coupled around the toroid outer perimeter 108. The support belt 200 is coupled along the planar exterior face 110. As previously described herein, the planar exterior face provides support to the support belt 200 and substantially prevents its decoupling (e.g., slipping off) from the outer shell 106. Stated another way, the support belt 200 is supported by the planar exterior face and thereby positioned along the toroid outer perimeter to engage with the planar exterior face 110 (whether through direct engagement with the planar exterior face or interposing engagement with a wrapping such as the interior course wrapping 310 previously described herein).

Several options for the method 1100 follow. In one example, forming the toroid body 102 includes engaging one or more mating lips 314 extending along the edge of the inner shell or outer shell 104, 106 with an edge of the other outer shell or the inner shell. As previously described and shown for instance in FIGS. 10A and 10B, the outer shell 106 including the outer shell upper edge 304 in one example includes a mating lip 314 sized and shaped to facilitate engagement between the outer shell 106 and the inner shell 104 along an inner shell upper edge 300. In a similar manner, the inner shell 104 includes a mating lip 314 extending along the inner shell lower edge 302 for engagement with the outer shell lower edge 306. Optionally, forming the toroid body 102 includes automatically engaging and aligning one of the upper or lower edge pairs of the shells 104, 106 with engagement and alignment of the other of the lower and upper edge pairs. In still another example, forming a toroid body 102 includes nesting the inner shell 104 within the outer shell 106. For instance, a longitudinal axis of the inner shell 104 is coincident with the longitudinal axis of the outer shell. One example of a toroid body longitudinal axis is shown in FIGS. 1A and 1B. The axes of the inner and outer shells 104, 106 are substantially coincident with the toroid body longitudinal axis 114 and are thereby coincident with each other. In yet another example, the method 1100 includes blocking a welding beam such as an electron beam from reaching an interior surface of one or more of the inner and outer shells 104, 106 with one or both of the mating lips 314.

Optionally, forming the toroid body 102 includes coupling the inner shell 104 having an inner shell thickness with the outer shell 106 having an outer shell thickness. The outer shell thickness is substantially equal to the inner shell thickness and the outer shell thickness is adjacent to the toroid outer perimeter 108. As previously described, the support belt 200 is provided along the toroid outer perimeter 108 to brace and support the toroid outer perimeter 108 against bulging force, for instance, the bulging force 700 shown in FIGS. 7A and 7B. The support belt 200 cooperates with the outer shell 106 to prevent deflection of the planar exterior face 110 shown for instance in FIG. 1B. By providing the support belt 200 the outer shell 106 may include a thickness corresponding to the thickness of the inner shell 104 (as opposed to greater thickness with attendant increases in weight). The lighter support belt 200 (relative to the material of the outer shell 106) provides the support and bracing needed to maintain the toroid outer perimeter 108 in the planar configuration shown in FIG. 1B (e.g., the planar exterior face 110).

In another example, forming the toroid body 102 includes coupling the inner shell 104 along upper and lower rounded corners 120, 122 of the outer shell 106. The upper and lower rounded corners 120, 122 optionally have corner thicknesses that are greater than the inner and outer shell thicknesses. As shown for instance, in FIGS. 3 and 4 the support belt 200 extends to the upper and lower rounded corners 120, 122 and begins to taper along tapered belt edges 406. By providing increased corner thicknesses 410 at the upper and lower rounded corners 120, 122 the outer shell 106 (in a region where the support belt 200 optionally provides less or minimal hoop support) is braced against stresses developed in the shell through bursting and bulging forces held within the vessel interior 308. Stated another way, in one example, the corner thicknesses 410 increase relative to the thicknesses of the inner and outer shells 104, 106 as the support belt 200 is gradually tapered and terminates as it extends along the upper and lower rounded corners 120, 122. The upper and lower corners 120, 122 with the increased corner thicknesses 410 are thereby able to substantially support themselves without the added support provided by the support belt 200.

In another example, the method 1100 includes forming the inner shell 104 with a tapered shape including, for instance, a curved or semi-circular shape. The inner shell 104 curves from the upper and lower edges 300, 302 toward a toroid inner perimeter 128 (see FIG. 1B). Stated another way, as previously described, the pressure vessel 100 is positioned in at least some examples within a rocket motor such as the rocket motor 800 shown in FIG. 8. The components of the rocket motor 800 form a composite shape 816. The taper (e.g., curved shape) of the inner shell 104 cooperates with the composite shape 816 to maximize the volume of the pressure vessel 100 and fill a pressure vessel void 818. That is to say, with the D-shaped profile 126 the pressure vessel 100 is able to substantially fill the pressure vessel void 818 and thereby maximize the fluid volume contained within the pressure vessel. Conversely, with the D-shaped profile 126 a smaller pressure vessel 100 may be used with the same storage capacity as a circular cross section toroid to minimize the footprint of the pressure vessel 100 within the pressure vessel void 818 and decrease the weight of the pressure vessel and overall weight of the rocket motor 800.

In still another example, the method 1100 includes wrapping an interior course wrapping 310 helically around the inner and outer shells 104, 106 including the toroid outer perimeter 108 and the planar exterior face 110 (see FIG. 5). In another example, coupling the support belt 200 around the toroid outer perimeter 108 includes engaging the support belt 200 along the interior course wrapping 310 located over the planar exterior face 110. Optionally, the method 1100 further includes wrapping an exterior course wrapping 312 helically around the inner and outer shells 104, 106. The exterior course wrapping 312 extends over the support belt 200, the interior course wrapping 310 and the toroid outer perimeter 108. As previously described, providing the interior and exterior course wrappings 310, 312 provides support and bracing to the inner and outer shells 104, 106 against stresses developed by bursting force 600 applied to the pressure vessel 100, for instance, along the D-shaped toroid profile 126 as shown in FIG. 6. In another option, coupling the support belt 200 around the toroid outer perimeter 108 includes wrapping one or more fabric hoops around the toroid outer perimeter 108 and adhering the one or more fabric hoops with the toroid outer perimeter with an adhesive. For instance, as shown in FIG. 2 the support belt 200 in one example includes an elongated trapezoidal belt extending from a first belt end 206 to a second belt end 208. The support belt 200 is sequentially wrapped around the toroidal perimeter 108 to gradually taper the support belt as shown in FIG. 4. In another example, the support belt 200 includes individual continuous belts having a variety of widths that are sequentially positioned around the toroid outer perimeter 108. For instance, as shown in FIG. 4, each of the layers 400, 402, 404 in this example includes an individual fabric hoop with a progressively narrowed width. Each of the fabric hoops is individually adhered to the toroid body 102 to thereafter form the support belt 200 as shown in FIG. 4. In still another example, the method 1100 includes wrapping one or more of the interior or exterior course wrappings 310, 312 helically around the inner and outer shells (as shown in FIG. 5) including wrapping carbon fibers (such as carbon fiber tape or tow) around the inner and outer shells and adhering the carbon fibers with the inner and outer shells with an adhesive.

CONCLUSION

A toroid pressure vessel including a D-shaped cross section and a method for making the same are discussed. The toroid pressure vessel includes a wrap assembly having a support belt that enhances toroid hoop strength. The toroid pressure vessel closely matches a composite shape formed by components within a rocket motor section. The D-shaped cross section provides a planar exterior face mated to a tapering (e.g., semicircular) inner shell. The planar exterior face is configured for positioning adjacent to a cylindrical shroud of a rocket motor section. The tapering inner shell is configured for positioning adjacent to a motor section tapered end and the tapering frustum of a rocket nozzle. The D-shaped toroid pressure vessel thereby fills the space between these components of the rocket motor section and correspondingly enhances the volume of gas storage allowed relative to previous designs. Conversely, the planar exterior face of the pressure vessel maximizes the storage capacity of the vessel and facilitates the use of a smaller pressure vessel (relative to a similar circular sectioned toroid) within the rocket motor section. The rocket motor section volume, weight and the like may thereby be minimized while still allowing for equivalent gas storage relative to previous designs.

The planar exterior face of the D-shaped toroid pressure vessel extends around at least a portion of the toroid outer perimeter and provides a planar surface to receive and retain a support belt extending around the toroid outer perimeter. In effect, the planar exterior face provides a stabilizing shelf that positions the support belt along the toroid outer perimeter and maintains the support belt along the perimeter. The planar exterior face thereby substantially prevents slipping of the support belt from around the toroid outer perimeter after the support belt is adhered to the vessel and the vessel is pressurized. The support belt extending around the toroid outer perimeter enhances the strength of the outer shell and enhances the strength of the pressure vessel against hoop stresses (e.g., stress caused by bulging force applied along the toroid perimeter as compared to bursting force incident on the perimeter of the toroid D-shaped cross section). The support belt further assists in maintaining the shape of the toroid pressure vessel and substantially prevents the tendency of a toroid body to straighten under pressure into a cylindrical configuration (e.g., the tendency of a toroid to fracture along a section and assume a more cylindrical shape).

In one example, the support belt is used in combination with helically wound courses of wrapping (e.g., carbon fiber tape, dipped carbon fiber tow and the like). The helically wound courses of wrapping enhance the strength of the D-shaped pressure vessel against bursting force applied along the perimeter of a toroid section (e.g., inner and outer shells) while the support belt protects against bulging force incident on the toroid outer perimeter (e.g., the outermost portion of the toroid corresponding to the outer shell). Additionally, the helically wound courses of wrapping engage with the support belt and further stabilize the support belt at the position along the toroid outer perimeter.

In the foregoing description, the subject matter has been described with reference to specific exemplary examples. However, it will be appreciated that various modifications and changes may be made without departing from the scope of the present subject matter as set forth herein. The description and figures are to be regarded in an illustrative manner, rather than a restrictive one and all such modifications are intended to be included within the scope of the present subject matter. Accordingly, the scope of the subject matter should be determined by the generic examples described herein and their legal equivalents rather than by merely the specific examples described above. For example, the steps recited in any method or process example may be executed in any order and are not limited to the explicit order presented in the specific examples. Additionally, the components and/or elements recited in any apparatus example may be assembled or otherwise operationally configured in a variety of permutations to produce substantially the same result as the present subject matter and are accordingly not limited to the specific configuration recited in the specific examples.

Benefits, other advantages and solutions to problems have been described above with regard to particular examples; however, any benefit, advantage, solution to problems or any element that may cause any particular benefit, advantage or solution to occur or to become more pronounced are not to be construed as critical, required or essential features or components.

As used herein, the terms "comprises", "comprising", or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present subject matter, in addition to those not specifically recited, may be varied or otherwise particularly adapted to specific environments, manufacturing specifications, design parameters or other operating requirements without departing from the general principles of the same.

The present subject matter has been described above with reference to examples. However, changes and modifications may be made to the examples without departing from the scope of the present subject matter. These and other changes or modifications are intended to be included within the scope of the present subject matter, as expressed in the following claims.

It is to be understood that the above description is intended to be illustrative, and not restrictive. Many other examples will be apparent to those of skill in the art upon reading and understanding the above description. It should be noted that examples discussed in different portions of the description or referred to in different drawings can be combined to form additional examples of the present application. The scope of the subject matter should, therefore, be determined with reference to the appended claims, along with the full scope of equivalents to which such claims are entitled.

What is claimed is:

1. A pressure vessel comprising:
    toroid body including an inner shell coupled with an outer shell forming a toroid cross section, each of the inner or outer shells includes respective upper and lower edges, and at least one upper edge and at least one lower edge includes mating lips extending along respective edges of the inner and outer shells, the toroid body includes a toroid outer perimeter, and the outer shell extends along the toroid outer perimeter;
    wherein the upper and lower edges opposed to the mating lips are flush with the corresponding upper and lower edges according to reception of the opposed upper and lower edges along the mating lips;
    a planar exterior face extends along at least a portion of the outer shell and the toroid outer perimeter; and
    a support belt circumscribes the toroid outer perimeter and is coupled along the planar exterior face, the support belt includes:
        a first belt layer around the toroid outer perimeter, the first belt layer having a first belt layer edge,
        a second belt layer over the first belt layer and around the toroid outer perimeter, the second belt layer having a second belt layer edge, and
        stepped tapered belt edges near upper and lower portions of the planar exterior face, the stepped tapered belt edges include the second belt layer edge recessed relative to the first belt layer edge.

2. The pressure vessel of claim 1, wherein the planar exterior face circumscribes the toroid outer perimeter.

3. The pressure vessel of claim 2, wherein the outer shell includes the planar exterior face and upper and lower rounded corners extending along the planar exterior face, the upper and lower rounded corners mate with the inner shell.

4. The pressure vessel of claim 1, wherein the planar exterior face is substantially parallel to a toroid body longitudinal axis.

5. The pressure vessel of claim 1, wherein the inner shell includes a curved shape, the inner shell curving from upper and lower edges of the inner shell toward a toroid inner perimeter.

6. The pressure vessel of claim 1, wherein the support belt includes carbon fibers impregnated with a resin.

7. The pressure vessel of claim 1 comprising an interior course wrapping extending helically around the inner shell and the outer shell including the planar exterior face, the interior course wrapping extends over the toroid outer perimeter.

8. The pressure vessel of claim 7, wherein the support belt is engaged along the interior course wrapping located over the planar exterior face.

9. The pressure vessel of claim 8 comprising an exterior course wrapping extending helically around the inner shell and the outer shell, the exterior course wrapping extends over the toroid outer perimeter, and the exterior course wrapping extends over the support belt and the interior course wrapping.

10. The pressure vessel of claim 1, wherein the support belt tapers in thickness at the stepped tapered belt edges according to the recess of the second belt layer edge relative to the first belt layer edge.

11. The pressure vessel of claim 10, wherein the support belt includes a cylinder extending between the upper and lower belt edges, and a cylinder longitudinal axis of the support belt is coincident with a toroid body longitudinal axis.

12. The pressure vessel of claim 11, wherein the thickness of the outer shell along the toroid outer perimeter is substantially equal to the thickness of the inner shell.

13. The pressure vessel of claim 1, wherein each of the upper and lower edges and the mating lips are at opposed polar locations of the toroid body.

14. The pressure vessel of claim 1, wherein the mating lips include planar flanges extending from the at least one upper edge and the at least one lower edge.

15. The pressure vessel of claim 14, wherein the mating lips are configured to block an electron beam between the respective upper and lower edges.

16. A method of making a pressure vessel comprising:
    forming a planar exterior face along at least a portion of an outer shell;
    forming a toroid body including coupling an inner shell with an outer shell, the outer shell extends along a toroid outer perimeter, and the planar exterior face extends along at least a portion of the toroid outer perimeter, coupling the inner and outer shells includes:
        flushly coupling an upper edge of the inner shell with an upper edge of the outer shell according to reception of one of the upper edges along a first mating lip of the other upper edge, and
        flushing coupling a lower edge of the inner shell with a lower edge of the outer shell according to reception of one of the lower edges along a second mating lip of the other lower edge; and
    coupling a support belt around the toroid outer perimeter, wherein the support belt is coupled along the planar exterior face, wherein coupling the support belt includes:
        applying at least a first belt layer around the toroid outer perimeter, the first belt layer including a first belt layer edge, applying at least a second belt layer over the first belt layer and around the toroid outer perimeter, a second belt layer edge of the second belt layer recessed from the first belt layer edge, and forming stepped tapered belt edges near upper and lower portions of the toroid outer perimeter according to the first and second belt layer edges.

17. The method of claim 16 wherein the mating lips extend directly beneath the respective upper and lower edges of each of the inner and outer shells, and comprising blocking a welding beam from reaching an interior surface of one or more of the inner and outer shells with the one or more mating lips.

18. The method of claim 16, wherein forming the toroid body includes nesting the inner shell within the outer shell, and a longitudinal axis of the inner shell is coincident with a longitudinal axis of the outer shell.

19. The method of claim 16, wherein forming the toroid body includes coupling the inner shell with an inner shell thickness with the outer shell having an outer shell thickness, the outer shell thickness is substantially equal to the inner shell thickness, and the outer shell thickness is adjacent to the toroid body perimeter.

20. The method of claim 19, wherein forming the toroid body includes coupling the inner shell along upper and lower rounded corners of the outer shell, and the upper and lower rounded corners have a corner thickness greater than the inner and outer shell thicknesses.

21. The method of claim 16 comprising forming the inner shell with a curved shape, the inner shell curving from upper and lower edges of the inner shell toward a toroid inner perimeter.

22. The method of claim 16 comprising wrapping an interior course wrapping helically around the inner and outer shells including the planar exterior face, the interior course wrapping extends over the toroid outer perimeter.

23. The method of claim 22, wherein coupling the support belt around the toroid outer perimeter includes engaging the support belt along the interior course wrapping located over the planar exterior face.

24. The method of claim 16 comprising wrapping an exterior course wrapping helically around the inner and outer shells, the exterior course wrapping extends over the support belt, the interior course wrapping and the toroid outer perimeter.

25. The method of claim 16, wherein coupling the support belt around the toroid outer perimeter includes wrapping one or more fabric hoops around the toroid outer perimeter and adhering the one or more fabric hoops with the toroid outer perimeter with an adhesive.

26. The method of claim 16 comprising wrapping one or more of interior or exterior course wrappings helically around the inner and outer shells including wrapping carbon fibers around the inner and outer shells and adhering the carbon fibers with the inner and outer shells with an adhesive.

27. The method of claim 16, wherein flushly coupling the upper edges includes flushly coupling the upper edges of the inner and outer shells at a first polar location of the toroid body, and flushly coupling the lower edges includes flushly coupling the lower edges of the inner and outer shells at a second polar location of the torpid body opposed to the first polar location.

\* \* \* \* \*

UNITED STATES PATENT AND TRADEMARK OFFICE
CERTIFICATE OF CORRECTION

PATENT NO. : 9,541,235 B2
APPLICATION NO. : 13/029769
DATED : January 10, 2017
INVENTOR(S) : Robert D. Travis Page 1 of 1

It is certified that error appears in the above-identified patent and that said Letters Patent is hereby corrected as shown below:

On the Title Page

On page 2, in Column 2, item (56) under "Other Publications", Line 4, delete "Opinon" and insert --Opinion-- therefor In the Claims In Column 21, Line 36, in Claim 1, before "toroid", insert --a--

In Column 22, Line 33, in Claim 12, delete "claim 11," and insert --claim 1,-- therefor In Column 24, Line 31, in Claim 27, delete "torpid" and insert --toroid-- therefor Signed and Sealed this
Thirtieth Day of November, 2021

Drew Hirshfeld
*Performing the Functions and Duties of the
Under Secretary of Commerce for Intellectual Property and
Director of the United States Patent and Trademark Office*